(12) United States Patent
Auslander

(10) Patent No.: US 7,182,451 B2
(45) Date of Patent: Feb. 27, 2007

(54) METHOD AND APPARATUS FOR HALFTONE PRINTING WITH MULTI-SIGNAL TRANSMISSION INK

(75) Inventor: Judith D. Auslander, Westport, CT (US)

(73) Assignee: Pitney Bowes Inc., Stamford, CT (US)

( * ) Notice: Subject to any disclaimer, the term of this patent is extended or adjusted under 35 U.S.C. 154(b) by 169 days.

(21) Appl. No.: 10/692,570

(22) Filed: Oct. 24, 2003

(65) Prior Publication Data
US 2005/0088500 A1 Apr. 28, 2005

(51) Int. Cl.
G01D 11/00 (2006.01)

(52) U.S. Cl. .................... 347/100; 347/95; 235/491

(58) Field of Classification Search ................ 347/100, 347/101, 95, 96, 42; 101/1; 252/301.15; 427/7; 106/31.6, 31.27, 31.13; 523/160; 235/491, 494, 487, 469; 705/62, 60; 358/405, 358/298, 456
See application file for complete search history.

(56) References Cited

U.S. PATENT DOCUMENTS

| | | | | |
|---|---|---|---|---|
| 4,553,173 A | * | 11/1985 | Kawamura | 347/252 |
| 5,554,842 A | * | 9/1996 | Connell et al. | 106/31.32 |
| 5,837,042 A | * | 11/1998 | Lent et al. | 347/100 |
| 5,946,103 A | * | 8/1999 | Curry | 358/3.28 |
| 6,176,908 B1 | * | 1/2001 | Bauer et al. | 106/31.15 |
| 2002/0096064 A1 | | 7/2002 | Fissell | 101/114 |

FOREIGN PATENT DOCUMENTS

| | | |
|---|---|---|
| EP | 1038690 A1 | 9/2000 |
| WO | WO03/011606 A1 | 2/2003 |

* cited by examiner

*Primary Examiner*—Manish S. Shah
(74) *Attorney, Agent, or Firm*—Charles R. Malandra, Jr.; Angelo N. Chaclas

(57) ABSTRACT

A method for printing indicium on an article including steps of providing a supply of ink including a multi-signal transmission ink which is adapted to provide an optically visual signal when viewed in normal daylight and adapted to provide a different signal which is adapted to be machine readable; and printing at least a portion of the indicium on the article by halftone printing the multi-signal transmission ink. The portion is adapted to be visually observable in normal daylight. The portion is adapted to be read as a non-halftoned signal by a machine even though the portion is halftone printed.

9 Claims, 20 Drawing Sheets

$20_{10}$ $20'_{10}$

METHOD AND APPARATUS FOR HALFTONE PRINTING WITH MULTI-SIGNAL TRANSMISSION INK

BACKGROUND OF THE INVENTION

1. Field of the Invention

The present invention relates to halftone printing and, more particularly, to printing with multi-signal transmission ink.

2. Brief Description of Prior Developments

In some applications indicium, such as one dimensional or two-dimensional bar codes, are printed on the items, such as mail pieces. For example, bar codes are often used on a mail piece such as with, or in, postage meter indicium. A black color is preferably used for printing two-dimensional bar codes and is the preferred color for optimal contrast and readability. One problem with the printing of black two-dimensional bar codes is that they can lead to easy duplication by available desktop printers or copiers. The black prints can easily be copied by any black-and-white copier or scanned and reprinted easily by available printers. To overcome these problems, in some applications it is desirable to pass some information covertly or at least provide a system for verifying the authenticity of the printed indicium. For example, it may be desired to verify the authenticity of postage on a mail piece. Color fluorescent inks are known such as described in U.S. patent application publication Nos. US 2002/0195586 A1, US 2003/0005303 A1, and US 2003/0041774 A1, which are hereby incorporated by reference in their entireties. Invisible ink jet inks are also described in U.S. patent application Ser. No. 10/331829 filed Dec. 30, 2002 which is also hereby incorporated by reference in its entirety.

A problem exists with regard to use of color fluorescent inks in that the inks are more expensive than conventional non-fluorescent inks. In addition, it is customary to increase ink usage for achieving better contrast and surface coverage. This creates the problem of increased costs. There is a desire to reduced costs associated with printing of more expensive inks, such as fluorescent or phosphorescent inks. However, there is also a desire to ensure sufficient quality of a printed indicium such that the indicium, or at least a portion of the indicium, can be machine readable.

SUMMARY OF THE INVENTION

In accordance with one method of the present invention, a method for printing indicium on an article is provided including steps of providing a supply of ink comprising a multi-signal transmission ink which is adapted to provide an optically visual signal when viewed in normal daylight and adapted to provide a different signal which is adapted to be machine readable; and printing at least a portion of the indicium on the article by halftone printing the multi-signal transmission ink. The portion is adapted to be visually observable in normal daylight. The portion is adapted to be read as a non-halftoned signal by a machine even though the portion is halftone printed.

In accordance with another method of the present invention, a method for printing indicium on an article is provided comprising steps of printing a supply of ink comprising a fluorescent ink; and printing at least a portion of the indicium on the article by dithering the fluorescent ink onto the article with a fill amount of at least a 50 percent reduction in a number of dots of the portion such that a reduced amount of fluorescent ink is used to print the indicium. The fluorescent ink provides a fluorescence intensity larger than one-half the fluorescence intensity of the portion if the portion was printed with twice the number of dots.

In accordance with another method of the present invention, a method for printing indicium on an article is provided comprising steps of providing a supply of ink comprising a color fluorescent ink; and printing at least a portion of the indicium on the article by halftone printing the fluorescent ink onto the article. A percentage of reduction in fluorescence intensity of the portion caused by the halftone printing is less than a percentage of increase in reflection of the portion caused by the halftone printing.

In accordance with another method of the present invention, a method for printing indicium on an article is provided comprising steps of determining an image to be printed as at least a part of the indicium; determining a pattern of dots to be printed to form a halftone image of the image based upon use of luminescent ink as an ink to print the halftone image; and printing the pattern of dots to form the halftone image by a print head. The halftone image is filled between about 10 to 35 percent, and luminescence of dots printed with the luminescent ink produces a combined luminescence brightness of about 35 to 80 percent of total possible brightness if the image was printed without halftone printing.

In accordance with one aspect of the present invention, a printed indicium is provided comprising a halftone image printed with color luminescent ink to form a first halftone image which is adapted to be read in normal daylight and a second halftone image which is luminescent. The second halftone image provides a ratio of luminescence intensity relative to quantity of the color luminescent ink which is larger than a ratio of the luminescence intensity relative to the quantity of the color luminescent ink if the halftone image was printed with a greater percent of a fill quantity of the color luminescent ink.

In accordance with another aspect of the present invention, a postage meter is provided comprising a supply of color luminescent ink; and a print head for printing the color luminescent ink onto an article. The print head is adapted for halftone printing. The postage meter is adapted to print the color luminescent ink as part of postage indicium as a halftone image such that the halftone image is both visually observable in normal daylight and observable in luminescence.

In accordance with another method of the present invention, a method for reading indicium on an article is provided comprising steps of providing a supply of ink comprising a luminescent ink; printing at least a portion of the indicium on the article by halftone printing or gray scale printing, wherein the step of printing uses less of the ink than if the indicium was printed without halftone or gray scale printing; and machine reading the portion of the indicium by subjecting the portion of the indicium to a source of excitation and causing the portion to illuminate.

In accordance with another method of the present invention, a method of reading indicium on an article is provided comprising steps of printing the indicium with luminescent ink; reading the indicium while the indicium is subjected to a source of excitation radiation; and reading the indicium after the indicium is no longer being subjected to the source of excitation radiation.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
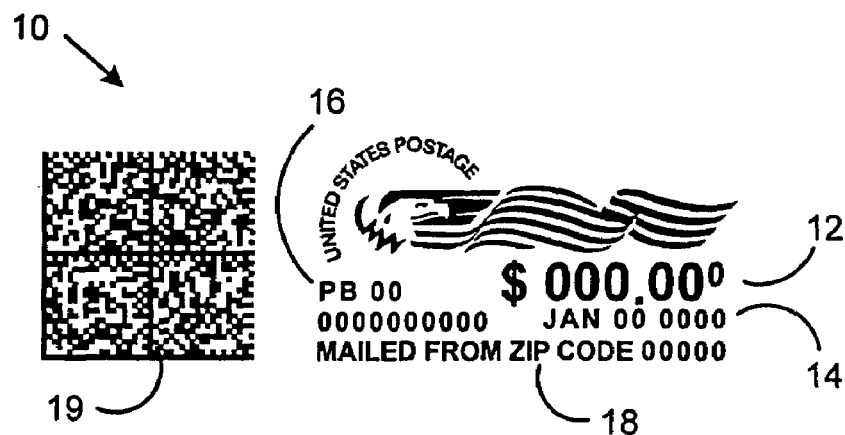
FIG. 1 is a plan view of a prior art postage indicium.

Referring to FIG. 1, there is shown a plan view of a prior art printed indicium 10. The printed indicium 10 generally comprises printed postage meter indicium. The indicium 10 comprises many different types of communicated information. The indicium 10 includes a postage value section 12, a date section 14, a meter identification section 16, a zip code source identification section 18, and a two-dimensional bar code section 19. The indicium 10 could comprise additional sections. The indicium 10 is preferably printed with a luminescent ink, such as a fluorescent ink or a phosphorescent ink.

Figure 2:
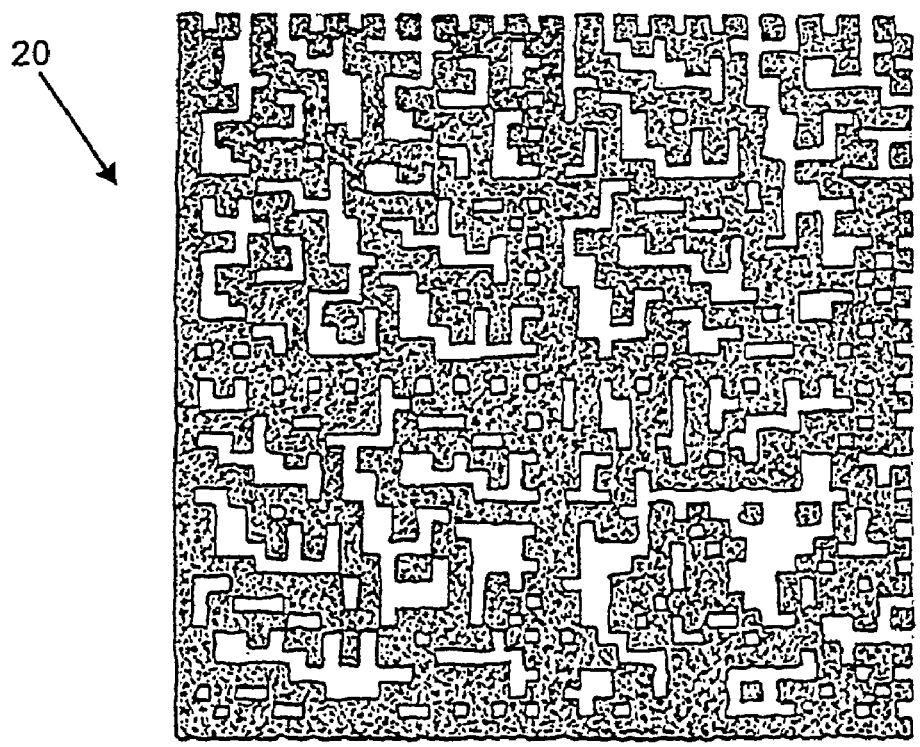
FIG. 2 is an enlarged view of a two-dimensional bar code section of an indicium similar to that shown in FIG. 1, but incorporating features of the present invention and shown in normal daylight or white light conditions.

Referring now to FIG. 2, an enlarged view of a two-dimensional bar code section 20 is shown which is intended to replace the two-dimensional bar code section 19 in the indicium 10. Although the present invention will be described with reference to the exemplary embodiments shown in the drawings, it should be understood that the present invention can be embodied in many alternate forms of embodiments. In addition, any suitable size, shape or type of elements or materials could be used.

Although the present invention is being described as a two-dimensional bar code section 20 for use in replacing the two-dimensional bar code section 19 of the postage indicium shown in FIG. 1, features of the present invention could be used in any suitable type of printed indicium, and could be used in other portions of the indicium 10. For example, features of the present invention could be used with indicium printed on a bank note, a tag, a ticket, a document, an identification card, or similar items.

Various two-dimensional barcode formats exist, such as Data Matrix 2D bar codes based on the AIM International Technical Specification—International Symbology Specification—marketed by AIM International, Inc; or PDF-417 symbology based on the Uniform Symbology Specification PDF-417 by AIM USA. An apparatus and method for printing two-dimensional bar codes is described in U.S. Pat. No. 6,631,012 B2 which is hereby incorporated by reference in its entirety. However, features of the present invention could be used with any suitable type of image or indicium or printed by any suitable method or apparatus. One of the features of the present invention is that it provides a level of security for a printed section, such as the two-dimensional bar code section. For example, the present invention can be used with a first inspection level in normal daylight, and a second inspection level such as with an ultraviolet lamp for example.

Application of the present invention could also comprise use of a multi-signal transmission ink such as, for example, a color fluorescent ink as further described below. In a preferred embodiment, the color fluorescent ink comprises a rare earth complex. Other types of a multi-signal transmission inks could comprise color inks which have a magnetic or electrical component to enable transmission of a magnetic signal or an electrical signal in addition to an optical signal.

For an embodiment other than a postage meter indicium, the indicium could comprise any suitable type of message or information displaying/carrying sections. In the embodiment shown, the bar code section 20 has a black color appearance in ambient normal daylight. As further explained below, the bar code section 20 could be comprised of other colors. In one type of alternate embodiment, the bar code section 20 could be comprised of multiple colors; one or more different colors at each of the different sections. In another type of alternate embodiment, the bar code section 20 could be comprised of a two-dimensional bar code printed in invisible ink.

Figure 3:
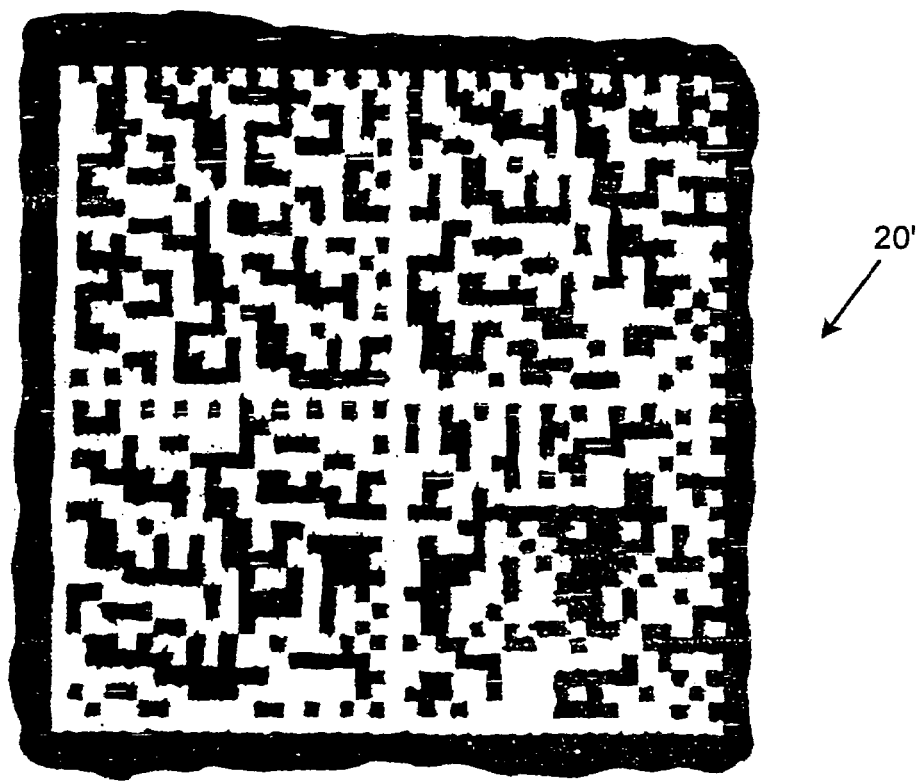
FIG. 3 is an enlarged view of the two-dimensional bar code section shown in FIG. 2 shown in luminescence as a negative image.

The bar code section 20 comprises a color fluorescent ink. The bar code section 20 might be able to be read by an optical reader in the same manner as the conventional bar code section 19 printed from a single ink source. However, when the bar code section 20 is subjected to a fluorescent exciting radiation source, as seen in FIG. 3, and shown as a negative or inverse image 20', the bar code section 20 can also be read or scanned as an illuminated (such as fluorescent) machine readable code. When fluoresced, the image produced can be read or scanned as a reverse or negative image as seen in FIG. 3.

Figure 4:
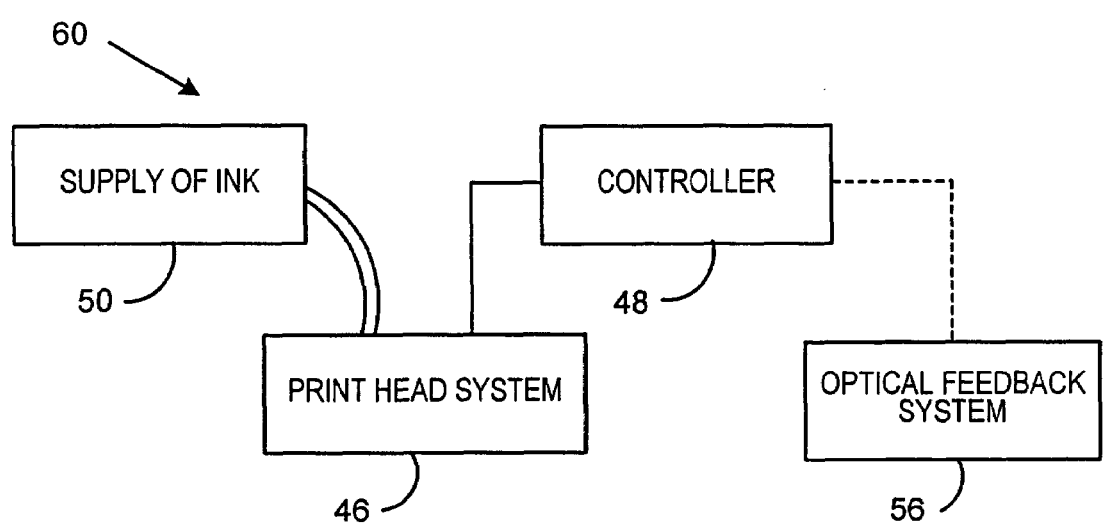
FIG. 4 is a schematic diagram of one type of system for printing indicium in accordance with the present invention.

Referring also to FIG. 4, there is shown a diagrammatic view of a system 60 for printing the indicium on an item, such as a mail piece for example. The system generally comprises a print head system 46 operably connected to a controller 48. The system 60 comprises at least one supply 50 of ink. As described above, the ink preferably comprises a color fluorescent ink which has a color under normal daylight, and which is fluorescent when subjected to a fluorescent exciting radiation illumination source. In alternate embodiments, the system 60 could comprise more than the one ink supply 50, and the inks could be different kinds. The print head system could comprise at least two print heads. In an alternate embodiment, the print head system could comprise a single multi-ink print head adapted to pass by an area on the item at least two times, a first one of the times for printing a first ink and a second one of the times for printing a second ink.

The controller 48 is adapted for controlling application of the ink by the print head system 46 on the item. In a preferred embodiment, the controller 48 is adapted to control the print head system 46 to print the ink as a dithered or halftoned image. In printing, dithering, which is different from gray scaling, is usually called halftoning. Halftoning comprises reducing the number of dots which form a pattern or image. Halftoning is usually used to create the illusion of new colors and shades by varying the pattern of dots. Newspaper photographs, for example, are often dithered. If you look closely, you can see that different shades of gray are produced by varying the patterns of black and white dots. There are no gray dots at all, merely black dots and white areas.

Referring back to FIG. 2, the two-dimensional bar code section 20 was printed by the system 60 with the use of halftoning. More specifically, the bar code section 20 was produced with a 45 percent quantity of fill; i.e., 55 percent less dots or fill than a full 100 percent fill or use of all the dots to form the image shown in FIG. 1. The image shown in FIG. 3 is a negative image of the image shown in FIG. 2. It has been discovered that the fluorescent image produced under ultraviolet light by the bar code section 20 with a 45 percent fill is substantially the same as the fluorescent image produced under ultraviolet light by the bar code section 20 with a 100 percent fill. This will be explained in more detail with the description of FIGS. 7 and 8.

Referring now to FIGS. 5A–5K, the bar code section 20 is shown at various different percentages of fill comprising 5 percent $20_5$, 15 percent $20_{15}$, 25 percent $20_{25}$, 35 percent $20_{35}$, 45 percent 20, 55 percent $20_{55}$, 65 percent $20_{65}$, 75 percent $20_{75}$, 85 percent $20_{85}$, 95 percent $20_{95}$ and 100 percent $20_{100}$, respectively. A section 24 is shown under each one of the different percent fills of the bar code section 20 as a reference to illustrate the percent fill relative to a solid black image which would be completely filled at 100 percent fill. As can be seen, the bar code section 20 printed at a fill percent of less than 50 percent can be difficult to clearly observe or read in normal daylight or white light.

Referring now also to FIGS. 6A–6K, the bar code section 20 is shown at the various different percentages of fill corresponding, respectively, to the images shown in FIGS. 5A–5K, as a negative image under an ultraviolet radiation source; the fills comprising 5 percent $20'_5$, 15 percent $20'_{15}$, 25 percent $20'_{25}$, 35 percent $20'_{35}$, 45 percent 20', 55 percent $20'_{55}$, 65 percent $20'_{65}$, 75 percent $20'_{75}$, 85 percent $20'_{85}$, 95 percent $20'_{95}$ and 100 percent $20'_{100}$, respectively. As can be seen, the bar code section 20' is relatively clear to see above at 15 percent fill and above. It has been discovered that with a fill rate as low as 10–45 percent the fluorescent image can be readily observed or read even though the corresponding non-fluorescent image (FIGS. 5A–5E) is not easily machine readable (although its presence may be easily detected; just not accurately read in white light).

Figure 7:
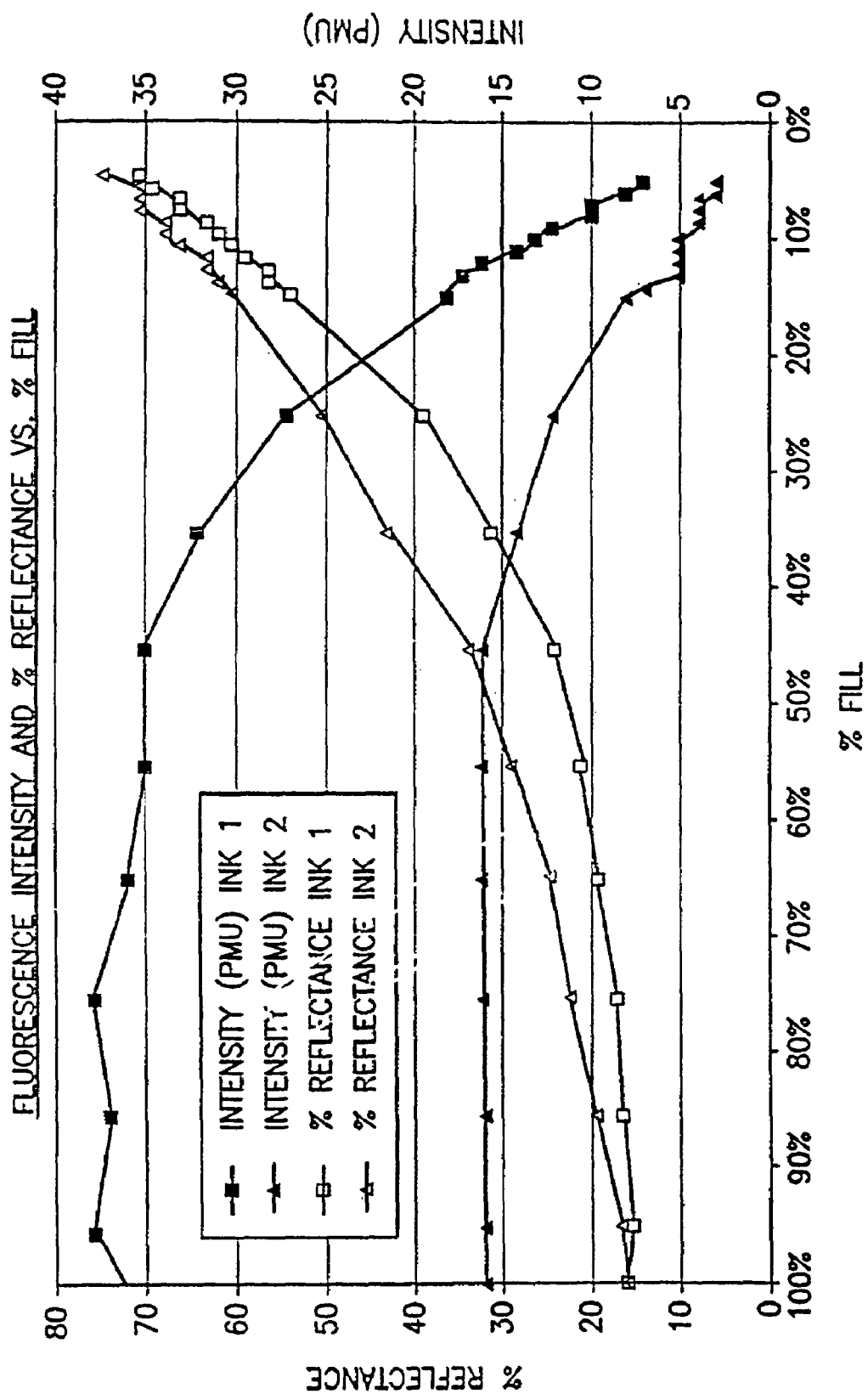
FIG. 7 is a chart of fluorescence intensity and percentage of reflectance verses percentage of fill for the two types of fluorescent ink used to print the two-dimensional bar code section shown in FIG. 2.

Referring now to FIG. 7, a chart showing experimental data collected for two color fluorescent inks, Ink 1 and Ink 2, is shown corresponding to percent fills verses fluorescence intensity and percentage of reflectance. Ink 1 is a fluorescent ink having a rare earth complex. Ink 2 is a fluorescent ink which does not have a rare earth complex. Ink 1 comprised a commercially available ink from Canon Inc. (black ink from a Canon BC 60 inkjet cartridge) having an addition of 25 percent LUMILUX® CD 380. LUMILUX® CD 380 is a rare earth complex sold by Rieldel-de Haen, which is a part of Honeywell Specialty Materials. Ink 2, which did not comprise the rare earth complex, comprised:

| Formulation of Heterogeneous BF Ink Using Sinloihi Dispersions (8/25/03, Lot# 03-183-9) | | |
|---|---|---|
| Components | wt(g) | wt (%) |
| Distilled Water | 27.6 | 26.7 |
| Glycerol | 7.5 | 7.3 |
| 1,2,4-butanetriol | 5.5 | 5.3 |
| Triethylene Glycol Mono Butyl Ether (BTG) | 2.2 | 2.2 |
| Sinloihi EXL-9151S Red Dispersion | 3.3 | 3.2 |
| Sinloihi EXL-9150S Orange Dispersion | 10.3 | 10.0 |
| Sinloihi EXL-9170S Red Dispersion | 19.3 | 18.7 |
| Sinloihi EXL-9183S Orange Dispersion | 17.7 | 17.1 |
| Acryjet Cyan 157 Dispersion | 5.98 | 5.79 |
| Triethanolamine | 0.4 | 0.34 |
| Urea | 3.5 | 3.4 |
| Total | 103.3 | 100.0 |
| OD (drawdown) | | 0.70 |
| PUM (drawdown) | | 62 |
| Viscosity (cp) | | 3.60 |
| Surface Tension (Dynes/cm) | | 39.5 |
| PH | | 7.43 |

As can be seen with both inks, the percentage of reflectance become smaller as the percentage of fill increases. The fluorescence intensity, measured in Phosphor Meter Units (PMU), increases as the percentage of fill increases. However, it has been discovered that the fluorescence intensity of the fluorescent inks at a 50 percent fill is substantially the same as the fluorescence intensity of the same image at a 100 percent fill. As can be seen in viewing FIG. 7, for Ink 1 the fluorescence intensity at 15 percent fill is about 18 PMU and the maximum fluorescent intensity is about 38 PMU. Thus, at 15 percent fill the fluorescent image can produce about 47 percent of the total possible fluorescence intensity for that image. The percentage of reflectance, however, at 15 percent fill is about 54 percent with a maximum of about 16 percent at 100 percent fill. Thus, at 15 percent fill the normal daylight image produces about 30 percent of the total possible viewable image. The percentage of fluorescence intensity is, thus, larger than the percentage of viewable image. The fluorescent image is, thus, easier to read than the daylight viewable image. This can occur because of optical bleeding of the fluorescent dots with adjacent fluorescent dots.

With this discovery, it is now possible to allow an indicium to be printed at less than 100 percent fill, such as 50 percent of less, with a fluorescent ink with the use of halftoning. This is counter-intuitive to the printing of two-dimensional bar codes; which would be expected to be printed with very precise digital printing (100 percent fill in "1" areas and no marking in "0" areas) to insure the accuracy of the two-dimensional bar code and accuracy in reading the code. Thus, the present invention allows less than 100 percent fill in a digital, machine readable indicium by the use of halftoning and a luminescent ink, such as a fluorescent ink.

The indicia or indicium can be read when subjected to a radiation source as a negative image which does not substantially look like a halftone image. One method of the present invention can comprise printing indicium on an article comprising steps of providing a supply of ink comprising a multi-signal transmission ink which is adapted to provide an optically visual signal when viewed in normal daylight and adapted to provide a different signal which is adapted to be machine readable; and printing at least a portion of the indicium on the article by halftone printing the multi-signal transmission ink, wherein the portion is adapted to be visually observable in normal daylight, and wherein the portion is adapted to be read as a non-halftoned signal by a machine even though the portion is halftone printed.

The method can comprise printing from a supply of ink comprising a fluorescent ink; and printing at least a portion of the indicium on the article by dithering the fluorescent ink onto the article with a fill amount of at least a 50 percent reduction in a number of dots of the portion such that a reduced amount of fluorescent ink is used to print the indicium, and wherein the fluorescent ink provides a fluorescence intensity larger than one-half the fluorescence intensity of the portion if the portion was printed with twice the number of dots. A percentage of reduction in fluorescence intensity of the portion caused by the halftone printing is less than a percentage of increase in reflection of the portion caused by the halftone printing. In a preferred method, the halftone image is filled between about 10 to 35 percent, and luminescence of dots printed with the luminescent ink produces a combined luminescence brightness of about 35 to 80 percent of total possible brightness if the image was printed without halftone printing. However, any suitable percentage of fill from less than 100 percent to about 10 percent could be used.

Figure 8:
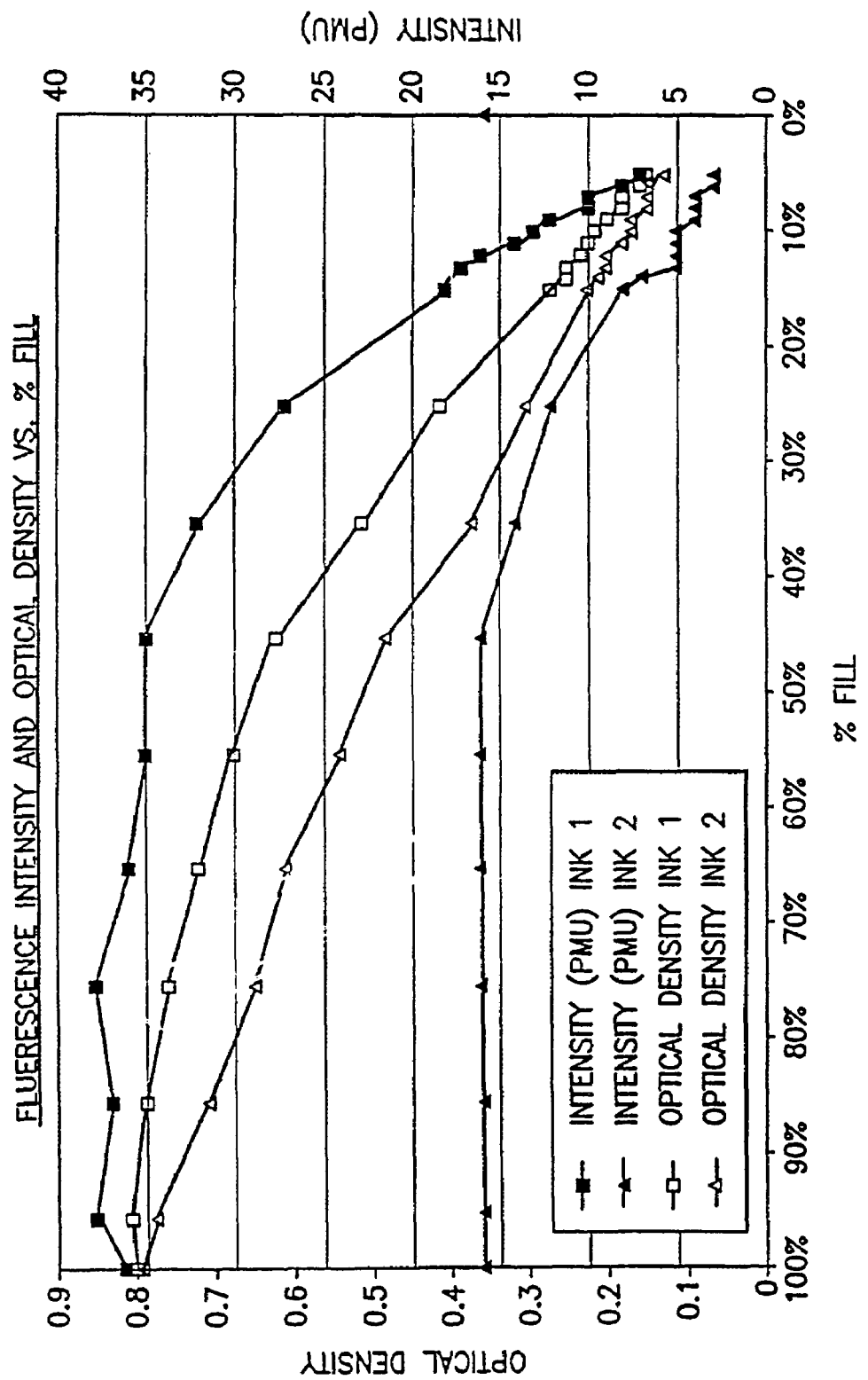
FIG. 8 is a chart of fluorescence intensity and optical density verses percentage of fill for the two types of ink used to print the two-dimensional bar code section shown in FIG. 2.

Referring also to FIG. 8, a graph of fluorescent intensity and optical density versus percentage of fill is shown corresponding to Ink 1 and Ink 2 of FIG. 7. As can be seen, the optical densities for the two inks increase with an increased percentage of fill. In one type of embodiment, such as a postage meter, the postage meter could comprise an optical feedback system 56 (see FIG. 4) with a densitometer to measure optical density during printing of the indicium to be used to signal the precise amount of percentage of fill being provided during printing and adjust printing with a real-time feedback, if appropriate. The densitometer can operate as a ratiometer to measure reflection. In alternate embodiments, any suitable type of real-time feedback system could be provided. Alternatively, a real time feedback might not be provided.

Figure 5A:
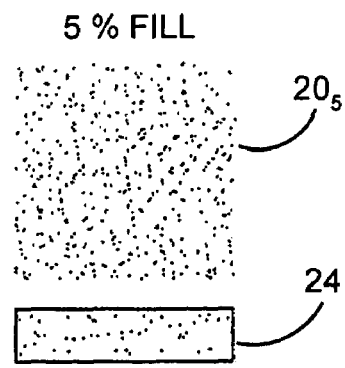
FIGS. 5A–5K show the two-dimensional bar code section of the indicium of FIG. 2 at various different percentages of fill including 5 percent, 15 percent, 25 percent, 35 percent, 45 percent, 55 percent, 65 percent, 75 percent, 85 percent, 95 percent and 100 percent, respectively.
Figure 5B:
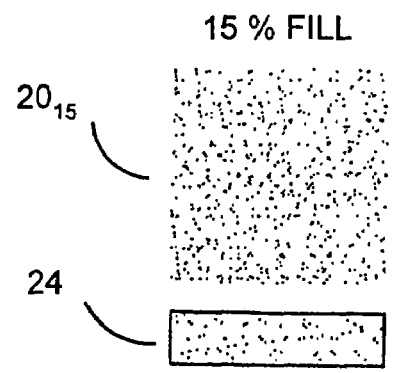
Figure 5C:
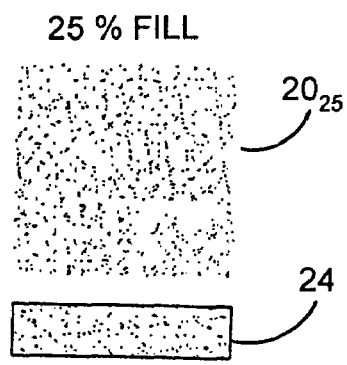
Figure 5D:
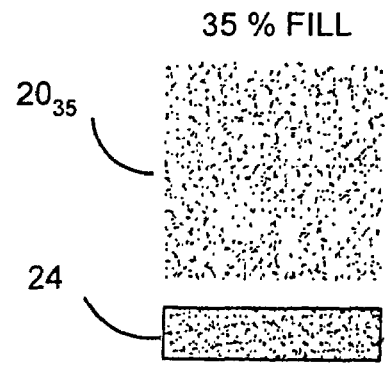
Figure 5E:
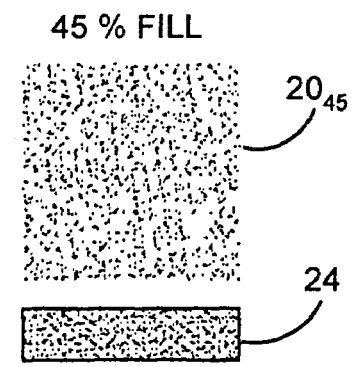
Figure 5F:
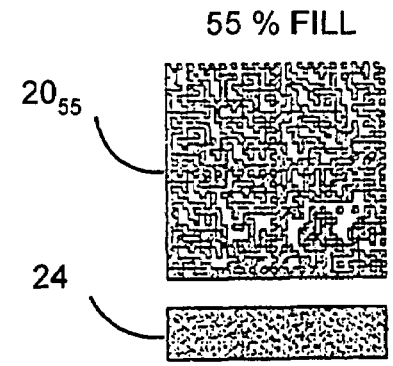
Figure 5G:
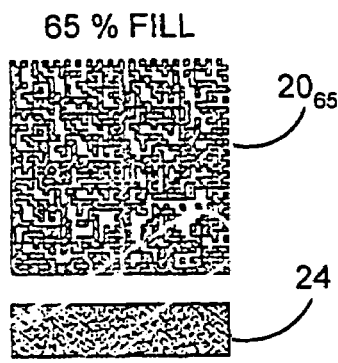
Figure 5H:
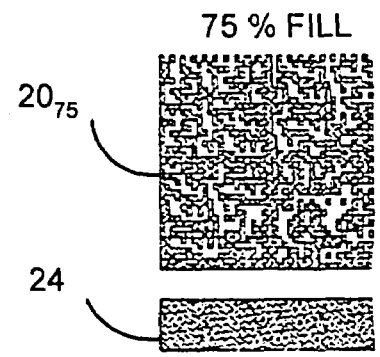
Figure 5I:
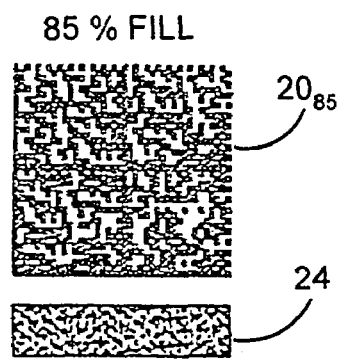
Figure 5J:
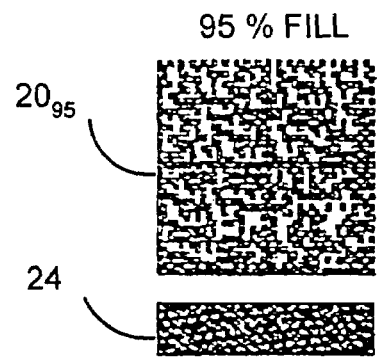
Figure 5K:
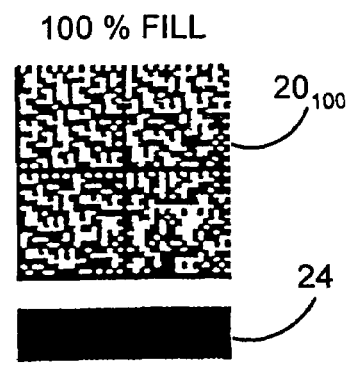
Figure 6A:
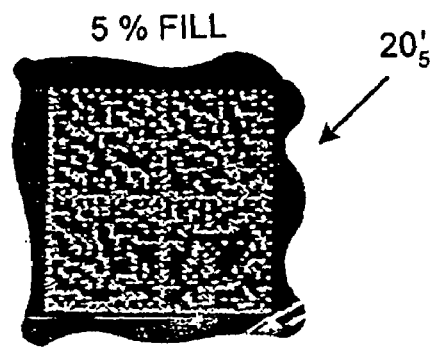
FIGS. 6A–6K show the two-dimensional bar code section at the various different percentages of fill corresponding, respectively, to the images shown in FIGS. 5A–5K as a negative image under an ultraviolet radiation source.
Figure 6B:
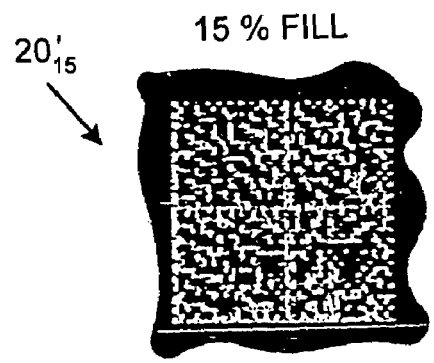
Figure 6C:
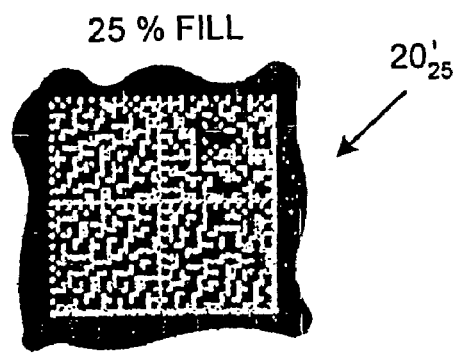
Figure 6D:
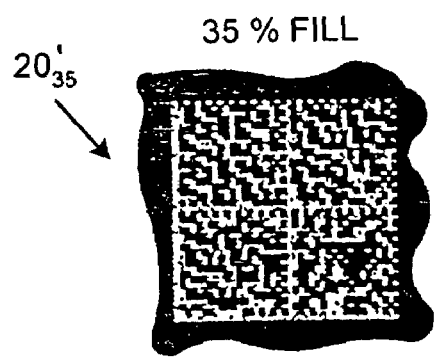
Figure 6E:
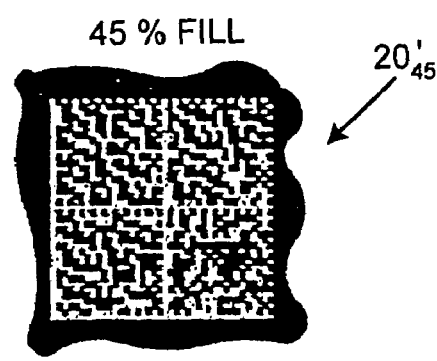
Figure 6F:
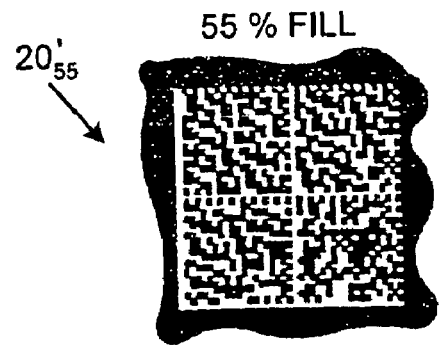
Figure 6G:
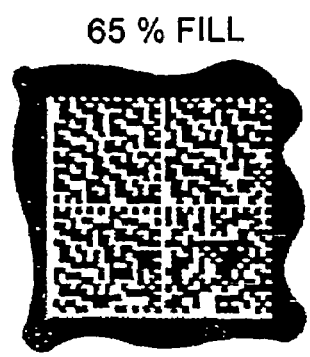
Figure 6H:
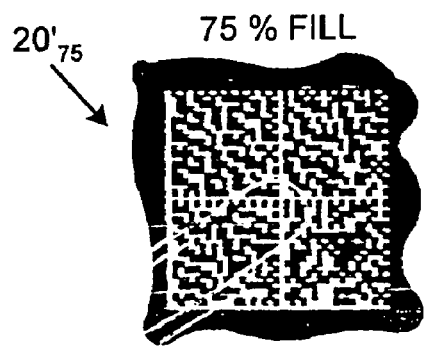
Figure 6I:
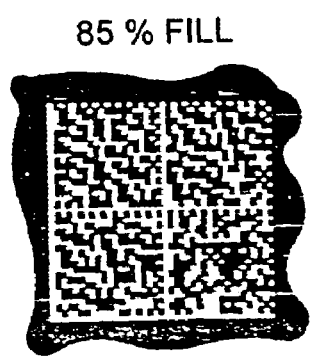
Figure 6J:
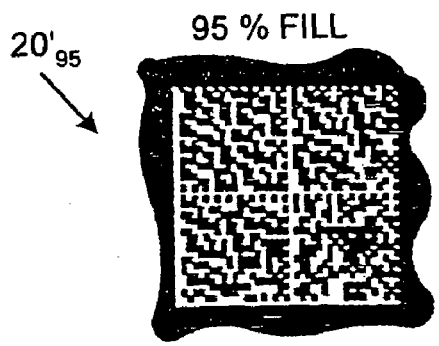
Figure 6K:
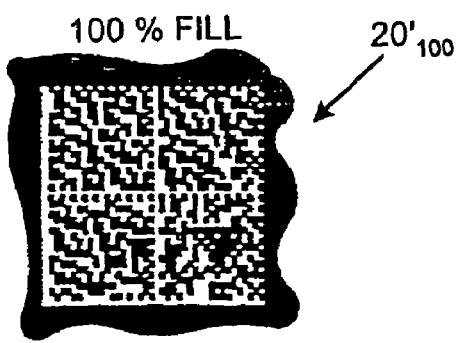
Figure 9:
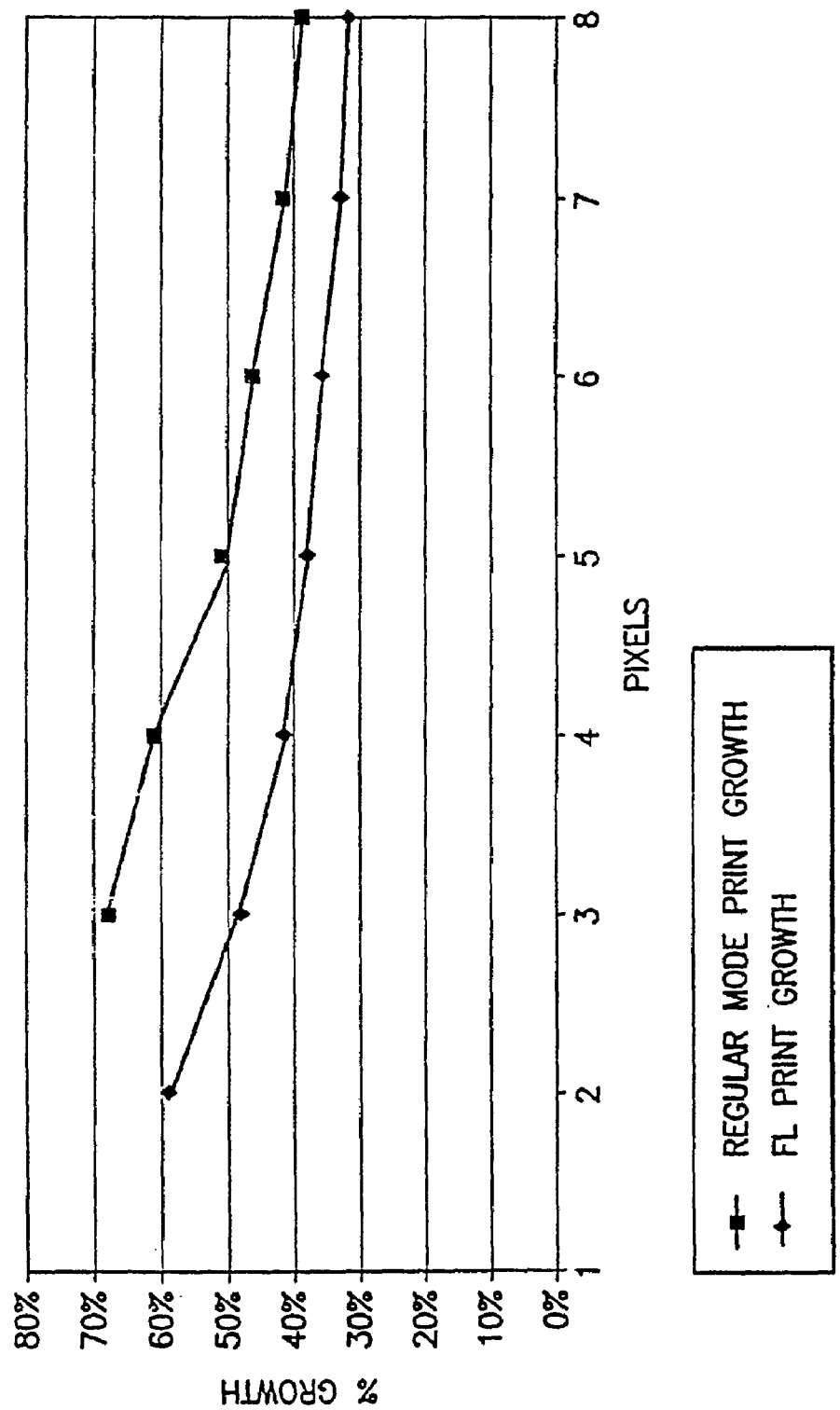
FIG. 9 is a chart of percentage of print growth for pixels of fluorescent ink versus non-fluorescent ink.
Figure 10:
FIG. 10 is an enlarged view of the two-dimensional bar code section shown in FIG. 5B.
Figure 11:
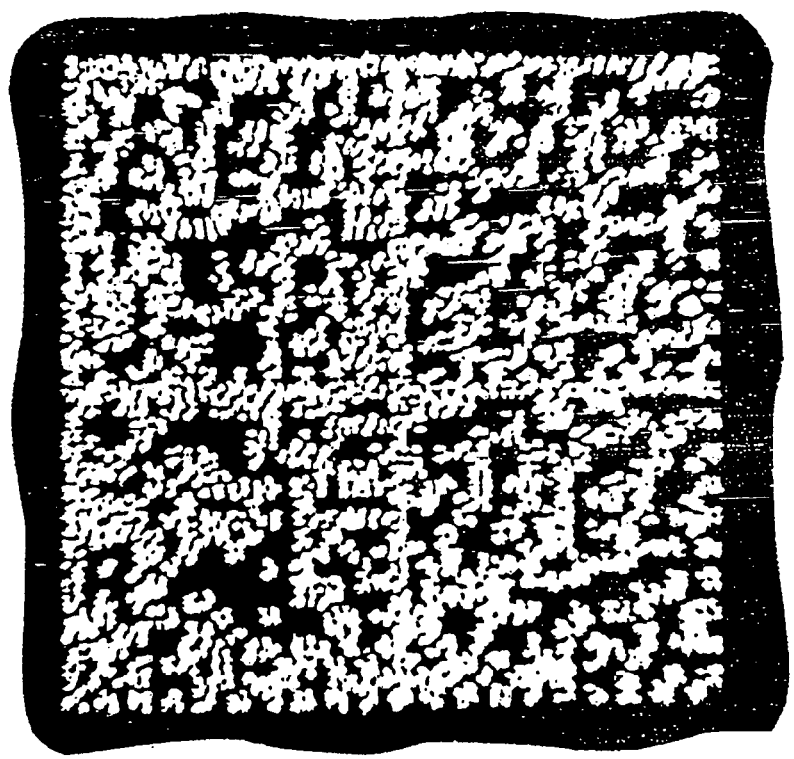
FIG. 11 is an enlarged view of the two-dimensional bar code section shown in FIG. 6B.
Figure 14:
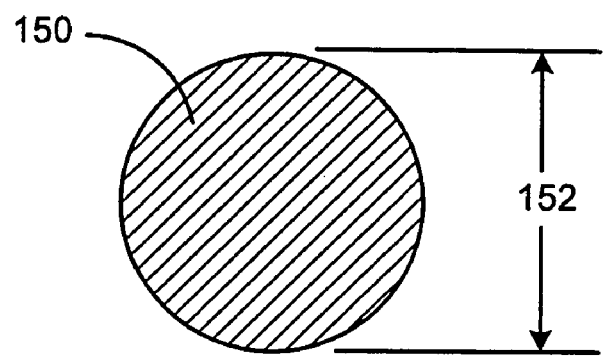
FIG. 14 is an enlarged view of a single dot of black fluorescent ink in white light.
Figure 15:
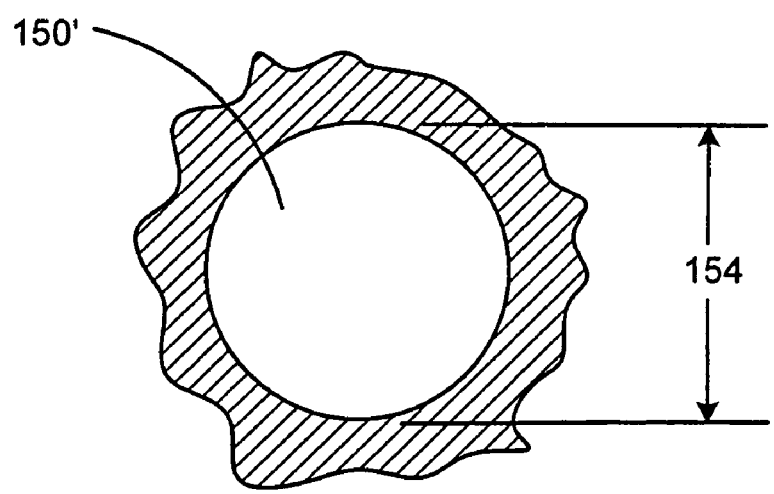
FIG. 15 is an enlarged view of the same dot of black fluorescent ink shown in FIG. 14 subjected to a fluorescent radiation source, shown in a negative image.

Referring now to FIG. 9, which shows a chart of percentage of growth per pixel of a fluorescent ink versus a non-fluorescent ink, and FIGS. 10 and 11, which show enlarged views of FIGS. 5B and 6B, discoveries related to the present invention will be described. As seen in FIG. 9, the percentage of print growth per pixel of the fluorescent ink is larger than the percentage of print growth of the non-fluorescent ink. The difference between the two inks is most pronounced at the smaller number of pixels (i.e., at a smaller image size). In addition, as shown by comparing the daylight or white light view $20_{10}$ shown in FIG. 10 to the negative image $20'_{10}$ from fluorescence shown in FIG. 11, the dots in the negative image from fluorescence shown in FIG. 11 are larger than the dots of the normal daylight shown in FIG. 10. It has been discovered that the image from a fluorescing dot is larger than its corresponding daylight or white light view. Referring also to FIGS. 14 and 15, a single dot 150 of black fluorescent ink used to form the two-dimensional bar code 20 of FIG. 1 is shown. FIG. 14 shows the dot 150 in normal daylight or white light. FIG. 15 shows the dot 150' as a negative image exposed to a fluorescent radiation source. The dot 150 has a size 152 in normal daylight. However, the same dot 150' has a larger size 154 when fluoresced as seen in FIG. 15. The daylight image shown in FIG. 14 is created by absorption of energy. The fluorescent image shown in FIG. 15 is created by fluorescing/radiating energy. The fluorescent energy, which radiates outward, causes this enlarged appearance.

When the indicium is subjected to fluorescent-exciting radiation, the contrast provided by the intensity of the fluorescence versus the relatively completely black background is greater than the contrast of ink versus background in normal daylight. This fluorescent intensity is even greater when the fluorescent ink has a rare earth complex. For example, Ink 1 has a higher fluorescence than Ink 2 because Ink 1 has a rare earth complex and organic fluorescent Ink 2 does not have a rare earth complex. This can be seen in comparing the UV light contrasts shown in FIGS. 16 and 17. The combination of these two discoveries (greater print growth for fluorescent ink especially at smaller pixels and higher contrast of fluorescence signal versus absorbing background as compared with normal white light contrast) allows indicium to be printed with color fluorescent ink, with use of a smaller quantity of the ink, such as with use of halftoning or dithering, to produce an image which can be read while fluorescing and still be slightly viewable under normal daylight or white light conditions.

In a preferred embodiment, the bar code section 20 is used with normal daylight or white light to register the bar code at a predetermined position, and then read the bar code 20 with the fluorescent exciting radiation source and scanner, or to turn on the fluorescent exciting radiation source and scanner as the mail piece passes through a reading device.

Figure 12:
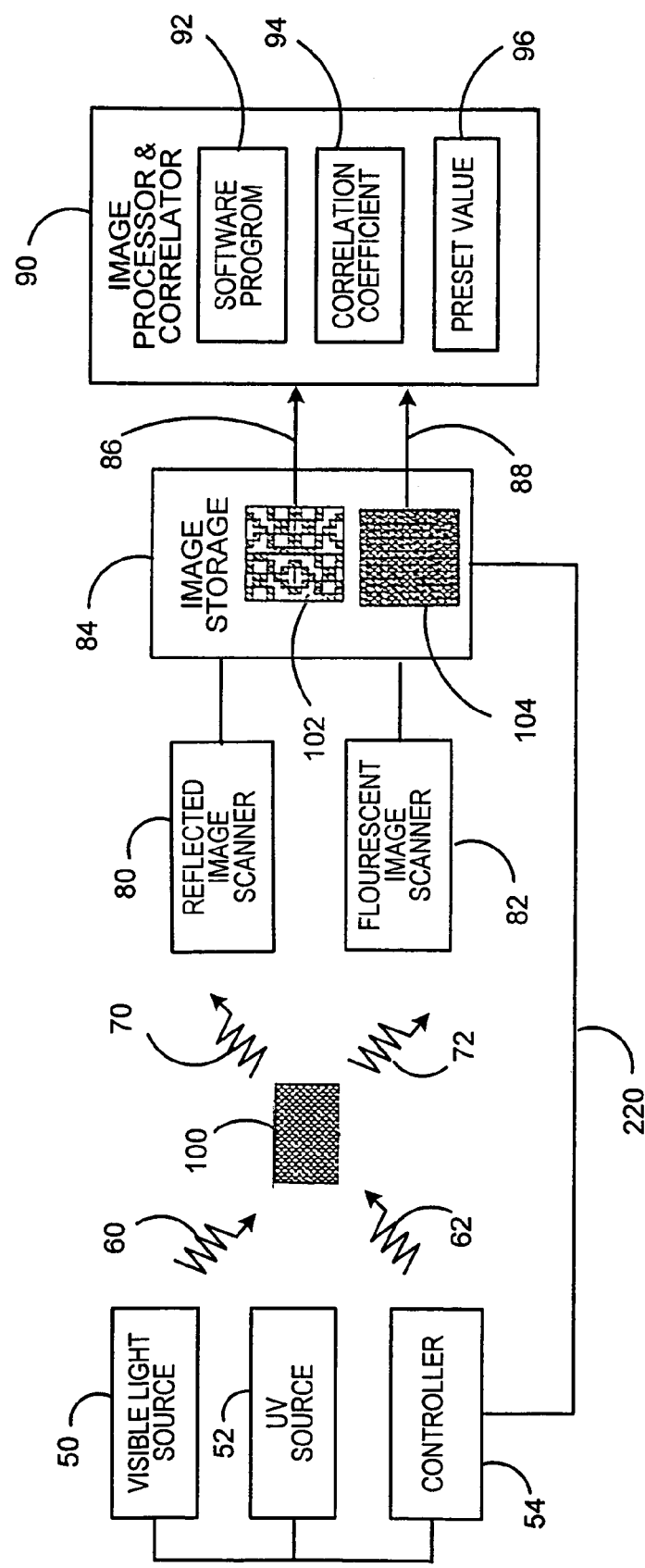
FIG. 12 is a schematic diagram of one type of system for reading an image made with features of the present invention.

FIG. 12 illustrates a system for validating a security marking 100, such as the two-dimensional bar code 20. As shown in FIG. 12, a visible light source 50 is used to provide illuminating light 60 on the security marking 100. With the reflected light 70 from the security marking 100, a reflected image scanner 80 can acquire the visible image 102. Similarly, an ultraviolet light source 52 is used to provide illuminating light 62 on the security marking 100. With the fluorescent emission 72 from the security marking 100, the fluorescent image scanner 82 can acquire the fluorescent image 104. Preferably, a controlling mechanism 54 is used to coordinate the illumination by the illuminating sources 50, 52 and the image acquisition by the image scanners 80, 82. The reflected image scanner 80 and the fluorescent image scanner 82 can acquire the respective images separately and sequentially. However, it is also possible to acquire the visible image 102 and the fluorescent image 104 simultaneously when appropriate filters and optical components are used to direct the reflected light 70 and the fluorescent emission 72 to the respective image scanners. It is preferred that the fluorescent image 104 and the visible image 102 are stored in an image storage 84, so that they can be processed. As shown, a signal or image data 86 indicative of the fluorescent image 104 and a signal or image data 88 indicative of the visible image 102 can be conveyed to an image processing and correlation device 90.

Because the fluorescent image 104 is a "negative" image of the visible image 102, if the data is compared, it may be preferable to process the image data 86, 88 before comparing the image data 86, 88. For example, a software program 92 can be used to compute a value 94 indicative of the correlation between the fluorescent image 104 and the visible image 102. The correlation value 94 can then be compared to a predetermined value 96 for determining whether the fluorescent image 104 and the visible image 102 are the results of the ink used to print the security marking 100. The security marking 100 can be assumed to be legally produced using the ink only if the correlation value 94 is equal or greater than the predetermined value 96, for example. It should be noted that, because the fluorescent emission from the ink can be limited to a certain wavelength range, it is possible to use a bandpass filter to allow only the fluorescent emission 72 in that wavelength range to reach the fluorescent image scanner 82. As such, the fluorescent emission from an illegal duplicate can be filtered out. While it is preferred to use an image scanner to obtain an image from the security marking, it is possible to use a digital camera or a video camera to obtain the image. It is also possible to use a film camera to obtain the image and a converting means to convert the film image to a digital image for processing.

Reading of the indicium can be done visually by a user under a fluorescence excitation source, and/or can be done with an automated or machine readable system. The excitation source and type of excitation radiation will be dependent on the color fluorescent ink which is used; generally ranging from ultraviolet to infrared. A reader can be adapted to read the fluorescent image and send a signal corresponding to the fluorescent image to another component, such as a processor for processing the scanned fluorescent image. In alternate embodiments, any suitable type of device or method for subjecting the indicium to an illuminating source and for automatically detecting the illuminated image and sending a signal to another component corresponding to the illuminated image could be provided. Although the present invention has been described with primary reference to a two-dimensional bar code section, features of the present invention could be used with a one dimensional bar code section, or any other suitable type of printed indicium. Features of the present invention could also be used with transparent fluorescent ink, color phosphorescent ink, or any other type of multiple signal type of ink such as color magnetic or color electrical ink.

Figure 13:
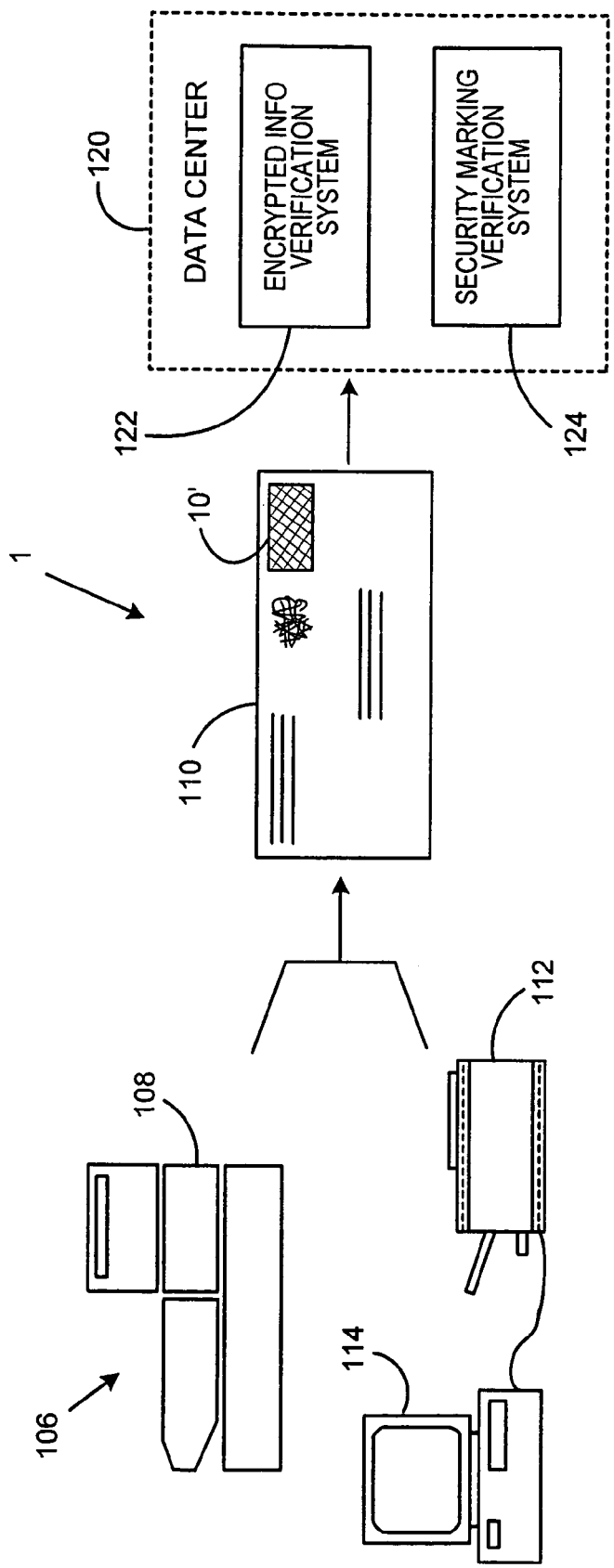
FIG. 13 is a schematic diagram of systems which can be used to print and read the indicium of FIG. 2 printed on, or attached to, a mail piece.

FIG. 13 illustrates an overall system for the authentication of an item using a security marking made from an ink of the present invention. For example, the system can be incorporated into an existing postage authentication system. As shown in FIG. 13, the system 1 can include a postage meter 106 having a print head 108 for printing a postage indicium and other mail or non-mail related information or images on the mail piece 110. Instead of the postage meter 106, a printer 112 can be connected to a computer 114 to print the information or images. When the mail piece is received by a data center 120, an encryption information verification system 122 can be used to validate the postage indicium 10' having the bar code 20 from the encrypted information contained therein. Additionally, a security marking verification system 124 can be used to verify a security marking from the fluorescent image and the visible image obtained therefrom. Preferably, the print head 108 is an inkjet print head and the printer 112 is an inkjet printer.

Fluorescence is an omni directional phenomena (scattering in all directions), measured verses an absorbent background (dark), while the contrast of diffuse reflectance measures the difference in the percentage of reflected radiation of the incident light from a reflective background. The present invention illustrates that by using a suitable type of ink, such as black fluorescent ink, and reading the image in fluorescence, the contrast achieved is much higher and a much lower coverage area (area which printed ink must cover) is needed. This overcomes the problem of increased ink usage for achieving better contrast and surface coverage. Therefore, the cost of printing indicium, such as postage with relatively expensive fluorescent ink, can be reduced. The difference between contrast in fluorescence and contrast in reflectance allows this advantage to be obtained. The present invention can be used for all postage meters or printers using ink jet printing for printing postage indicium. The ink usage can be decreased up to 85 percent when the bar codes are intended to be read in fluorescence.

The present invention illustrates that by using any suitable ink, such as black fluorescent ink and especially with a rare earth complex, the image printed can be read by double scanning; in black, positive contrast and in fluorescence by using the negative contrast created by using fluorescence intensity as the optical signal. The fluorescence can be measured on "front surface" measurements which, different than solution fluorescence, do not exhibit the "inner filter affect" characteristic to concentration quenching and "non uniform distribution of fluorescence" with higher concentrations on surface than in the bulk. A basic equation defining the relationship of fluorescence to concentration can be:

$$F = \emptyset Io(1 - e^{-\epsilon bc})$$

Where F is fluorescence; Ø is the quantum efficiency; Io is the incident radiant power; ε is the molar absorptivity; b is the path length; and c is the molar concentration. For very dilute solutions or concentrations on paper, where K is a proportionality constant, the equation becomes:

$$F = K\emptyset Io\epsilon bc.$$

Since fluorescence intensity is proportional with the concentration on the paper at low concentrations, and reaches a plateau at higher concentrations less than 100 percent of fill, it is possible to define various levels of fluorescence at increasing concentrations. Various levels of fluorescence can be defined as "gray levels of fluorescence" similar to gray level of colored and especially of black inks. The dependence of various concentrations of fluorescence on area coverage can be measured by measuring fluorescence intensity with a fluorometer. The fluorescence intensity measurements can be important to this concept and, an inexpensive and low-cost sensor can be developed for this purpose for adoption in printing devices or postage meters. The present invention comprises use of high intensity fluorescent images combined with visual images (to identify the presence of the print) in order to improve print quality characteristics, such as contrast, fill area and modulation due to the advantages obtained by measuring the fluorescence. The print growth, which is higher in fluorescence, can compensate for the lower usage of ink that would otherwise be accompanied by regular black-and-white contrast. The results of gradual changes of fluorescence as well as of reflectance are shown in FIGS. 7 and 8.

The following tables illustrate some empirical readability results obtained by use of Ink 1 and Ink 2 shown in FIGS. 7 and 8. All data listed in the following tables are an average of at least 2 measurements. (For inconsistent barcodes an average of 5 measurements were taken). Tables 1, 2 and 3 relate to Ink 1. NR=No read.

TABLE 1

UV Light - Maximum Aperture

| % Fill | Modulation | Contrast Value | Contrast Grade | Print Growth Grade | Unused Error Correction |
|---|---|---|---|---|---|
| 100% | 26% | 72% | A | F | 100% |
| 95% | 24% | 74% | A | F | 75% |
| 85% | 17% | 67% | B | F | 88% |
| 75% | 16% | 64% | B | F | 67% |
| 65% | 21% | 70% | A | F | 75% |
| 55% | 20% | 68% | B | F | 78% |
| 45% | 32% | 70% | A | D | 86% |
| 35% | 24% | 72% | A | C | 82% |
| 25% | 42% | 72% | A | B | 84% |
| 15% | 36% | 76% | A | A | 80% |
| 14% | 33% | 70% | A | A | 77% |
| 13% | 44% | 72% | A | A | 66% |
| 12% | 12% | 69% | A | A | 23% |
| 11% | 34% | 72% | A | A | 0% |
| 10% | 0% | 69% | A | A | 0% |
| 5% | NR | NR | NR | NR | NR |

Table 1 shows optimal readability conditions for the fluorescent barcode in the range of 14–25% fill where all print quality conditions are optimal including unused error correction, print growth grade, contrast grade and modulation. This supports the present invention by showing that the print growth of fluorescence is unacceptably high in the high concentration range due to fluorescent optical bleeding effect. Therefore, this effect can be used as an advantage that is realized in the present invention by achieving high readability and print quality grades at low concentrations of ink, such as 15–25%.

TABLE 2

White Light - Calibrated at 240

| % Fill | Modulation | Contrast Value | Contrast Grade | Print Growth Grade | Unused Error Correction |
|---|---|---|---|---|---|
| 100% | 48% | 60% | B | D | 96% |
| 95% | 65% | 60% | B | D | 100% |
| 85% | 68% | 59% | B | D | 100% |
| 75% | 68% | 58% | B | C | 100% |
| 65% | 77% | 58% | B | B | 100% |
| 55% | 71% | 56% | B | B | 100% |
| 45% | 75% | 56% | B | B | 100% |
| 35% | 65% | 53% | C | A | 92% |
| 25% | 52% | 46% | C | A | 68% |

TABLE 2-continued

White Light - Calibrated at 240

| % Fill | Modulation | Contrast Value | Contrast Grade | Print Growth Grade | Unused Error Correction |
|---|---|---|---|---|---|
| 15% | 28% | 44% | C | A | 69% |
| 14% | 29% | 42% | C | A | 55% |
| 13% | 51% | 42% | C | A | 60% |
| 12% | 32% | 42% | C | A | 13% |
| 10–11% | NR | NR | NR | NR | NR |

For Table 2, at similar concentrations (14–25%), the contrast grade is much lower (C instead of A).

TABLE 3

UV Light - Calibrated at 240

| % Fill | Modulation | Contrast Value | Contrast Grade | Print Growth Grade | Unused Error Correction |
|---|---|---|---|---|---|
| 100% | 39% | 76% | A | F | 69% |
| 95% | 54% | 76% | A | F | 94% |
| 85% | 59% | 79% | A | D | 98% |
| 75% | 55% | 78% | A | D | 98% |
| 65% | 61% | 72% | A | C | 100% |
| 55% | 60% | 67% | B | C | 98% |
| 45% | 67% | 68% | B | B | 100% |
| 35% | 58% | 71% | A | B | 100% |
| 25% | 58% | 67% | B | A | 78% |
| 15% | 52% | 35% | C | A | 54% |

Tables 4 and 5 show results for Ink 2.

TABLE 4

UV Light - Maximum Aperture

| % Fill | Modulation | Contrast Value | Contrast Grade | Print Growth Grade | Unused Error Correction |
|---|---|---|---|---|---|
| 100% | 56% | 52% | C | C | 100% |
| 95% | 62% | 43% | C | C | 100% |
| 85% | 59% | 42% | C | B | 100% |
| 75% | 60% | 37% | D | B | 100% |
| 65% | 61% | 42% | C | B | 100% |
| 55% | 62% | 49% | C | A | 100% |
| 45% | 57% | 37% | D | A | 96% |
| 35% | 60% | 39% | D | A | 88% |
| 25% | 43% | 40% | C | A | 92% |
| 15% | 30% | 29% | D | A | 88% |
| 14% | 35% | 21% | D | A | 50% |
| 13% | 30% | 21% | D | B | 40% |
| 12% | 30% | 20% | D | C | 60% |
| 11% | 35% | 18% | F | B | 22% |
| 10% | NR | NR | NR | NR | NR |
| 5% | NR | NR | NR | NR | NR |

For Ink 2, minimum readable % Fill is 10–11%. Readability is very inconsistent at this point.

TABLE 5

White Light - Calibrated at 240

| % Fill | Modulation | Contrast Value | Contrast Grade | Print Growth Grade | Unused Error Correction |
|---|---|---|---|---|---|
| 100% | 80% | 62% | B | B | 100% |
| 95% | 67% | 56% | B | B | 100% |

TABLE 5-continued

White Light - Calibrated at 240

| % Fill | Modulation | Contrast Value | Contrast Grade | Print Growth Grade | Unused Error Correction |
|---|---|---|---|---|---|
| 85% | 80% | 61% | B | A | 100% |
| 75% | 80% | 60% | B | A | 100% |
| 65% | 79% | 56% | B | A | 100% |
| 55% | 63% | 54% | C | A | 92% |
| 45% | 36% | 52% | C | A | 75% |
| 35% | 69% | 48% | C | A | 67% |
| 25% | 68% | 44% | C | A | 96% |
| 15% | 63% | 38% | D | A | 100% |
| 14% | 69% | 37% | D | A | 90% |
| 13% | 67% | 37% | D | A | 86% |
| 12% | 63% | 35% | D | B | 84% |
| 11% | 54% | 34% | D | B | 71% |
| 10% | NR | NR | NR | NR | NR |
| 5% | NR | NR | NR | NR | NR |

TABLE 6

| Theoretical Fill | Actual Fill (after Photoshop Dispersion Dither) |
|---|---|
| 100% | 100% |
| 95% | 93% |
| 85% | 79% |
| 75% | 67% |
| 65% | 56% |
| 45% | 37.5% |
| 35% | 28.5% |
| 25% | 20% |
| 15% | 12% |
| 5% | 4% |

Table 6 shows the relationship of the intended (theoretical) percentage fill and the actual percentage fill realized by using an application such as Adobe Photoshop™.

The following are some references for the terms used above.

Cell Modulation—A good quality Data Matrix two-dimensional bar code should produce an image in which all the dark cells have very similar low grayscale values and all the light cells have very similar high grayscale values. The cell modulation problem arises when there are cells whose grayscale values are close to the mid point of the low and high grayscale values, making the determination of the cell polarity more difficult. The Cell Modulation is designed to measure the inconsistency of the grayscale values. A high cell modulation indicates the dark cells are sufficiently dark and the light cells are sufficiently light. A low value indicates some of the cells are neither dark nor light. The Cell Modulation ranges between 0 and 100%.

Contrast—The symbol contrast is the difference in reflectance (measured by grayscale values) between the light and dark cells of the symbol. It is measured according to AIM specifications. The arithmetic mean of the darkest 10% of the pixels and that of the lightest 10% of the pixels within the Data Matrix bar code area are computer. The symbol contrast is the difference of the two means divided by the full gray scale range.

Unused Error Correction (UECC)—A Data Matrix bar code symbol has fixed error correction capacity. When a Data Matrix bar code is decoded the Error Correction (used) indicates how much of the error correction capacity is consumed in order to decode the symbol. The more error correction is used the less the UECC is left within the error correction capacity, which corresponding to poorer print quality of the symbol.

Print Growth Percentage—The print growth measures how much Data Matrix bar code cells are over or under printed. Ideally the dark cells and lights cells should be at the same size. The nominal cell size for overprinted Data Matrix bar code cell is a positive value. For under printed Data Matrix bar code cell the print growth is negative corresponding to cell shrinkage. The print growth is based on the cells on the two timing borders for AIM measurement. Our implementation uses all the cells in the Data Matrix bar code . When the cells in the timing border have the same print growth as the rest of the matrix cells our print growth measurement coincides with the AIM measurement. We display the print growth value as a percentage value. (Example Dark on Light w/ nominal cell size 10 pixel. Are the dark cells have an average size of 12 pixels. Then the growth is (12–10)/10=20%. If we assume the average cell size of the dark cells is 8 pixels than the print growth is (8–10)/10=–20%.)

Overall Grade—The overall grade is the lowest grade of Symbol Contrast, Axial non-uniformity, Print Growth, and unused Error Correction.

One method of halftoning can comprise use of a halftone look-up table. Another method could comprise dot diffusion. In alternate embodiments, any suitable type of method for dithering or halftoning, or even gray scaling, could be provided. General purpose dithering algorithms can be generated for the best visual appearance. It might be possible to create a special purpose method for printing bar codes with low ink volumes. For example, for a Data Matrix bar code, the center of the module is generally more critical than the edges, so the gray level could be highest in the center. One known technique that slightly reduces ink usage and improves reading with print growth is "pixel shaving" which leaves out the outer edges of a printed region, either on the upper and right sides or all around, depending on dot growth. It could be combined with dithering.

Figure 16:
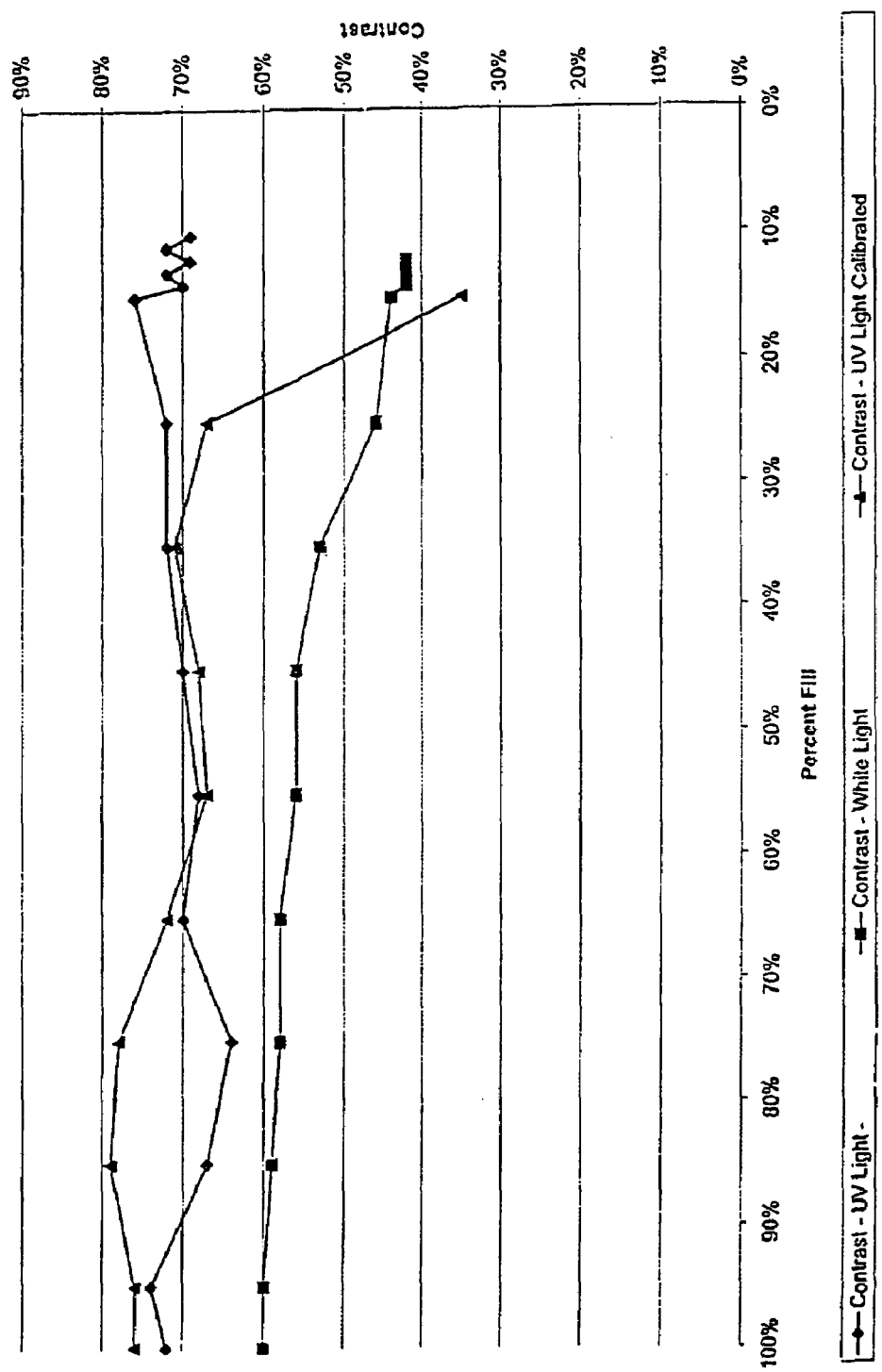
FIG. 16 is a chart of contrast versus percent fill of the Data Matrix bar code shown in FIG. 2 for a first ink.

Referring also to FIG. 16, a chart of contrast versus percent fill of the Data Matrix bar code 20 is shown for Ink 1 measured with Ultraviolet light, white light and Ultraviolet light calibrated with a histogram threshold at 240 rather than a maximum of 255. As can be seen, the contrast of the bar code 20 under Ultraviolet light does not significantly change between 10–100 percent. With a calibrated measurement, the contrast of the bar code 20 under Ultraviolet light does not significantly change between 25–100 percent.

Figure 17:
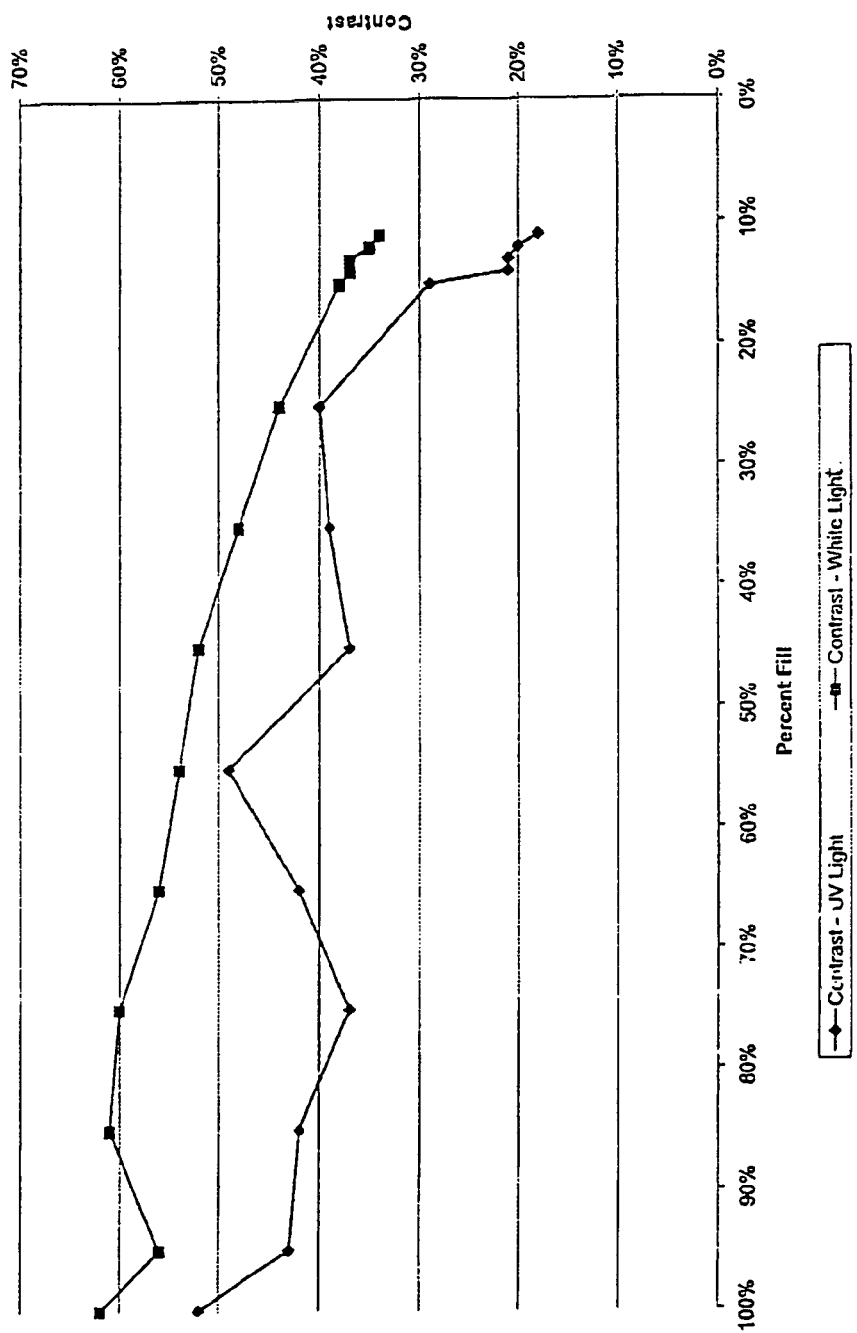
FIG. 17 is a chart of contrast versus percent fill of the Data Matrix bar code shown in FIG. 2 for a second ink.

Referring also to FIG. 17, a chart of contrast versus percent fill of the Data Matrix bar code 20 is shown for Ink 2 measured with Ultraviolet light and white light. The contrast of the bar code 20 under Ultraviolet light does not significantly change between 25–100 percent.

Figure 18:
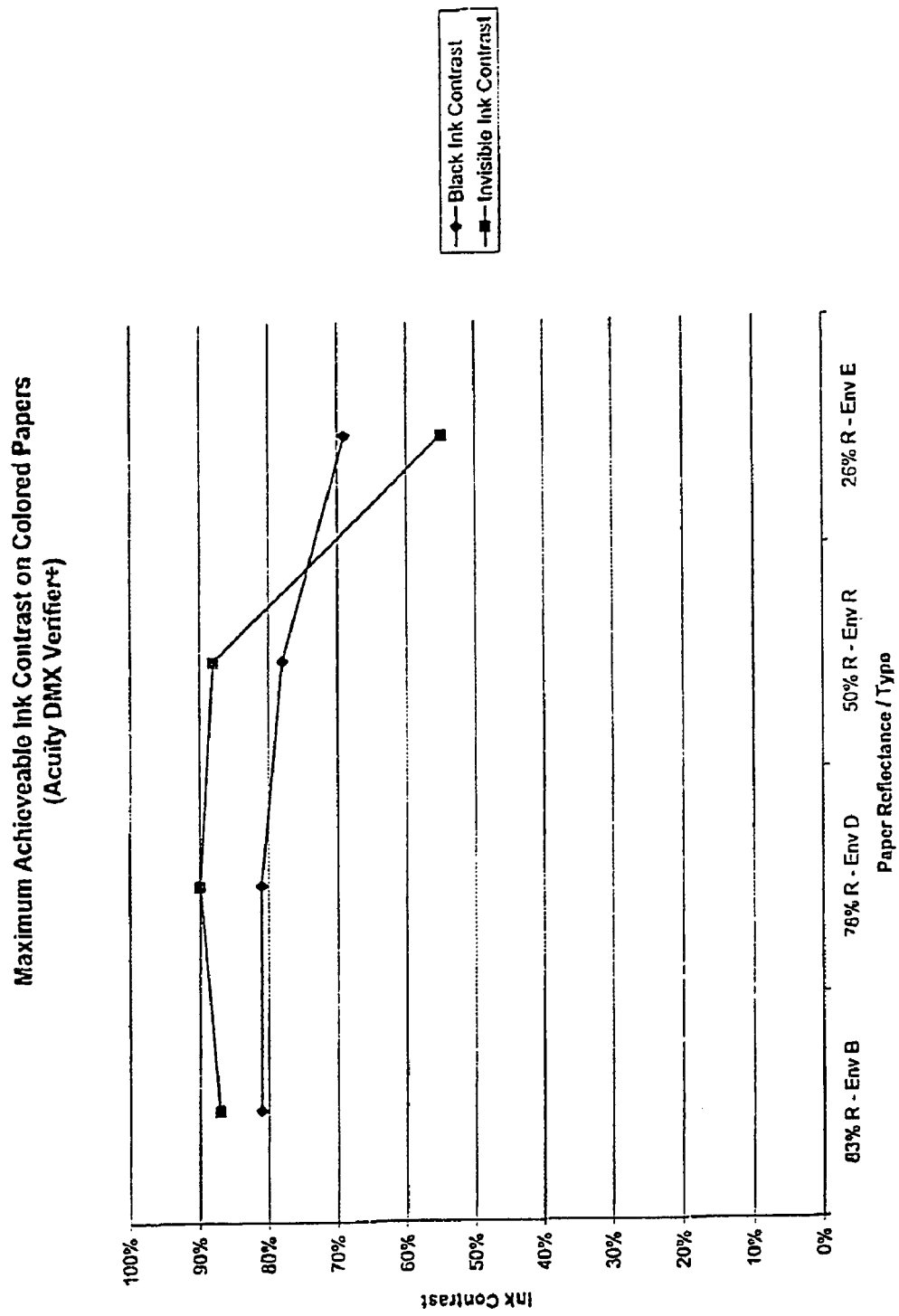
FIG. 18 is a chart showing test measurements for maximum achievable ink contrast on different colored papers for both invisible fluorescent ink using inverse contrast and black fluorescent ink using regular contrast.

Referring also to FIG. 18, a chart showing test measurements for maximum achievable ink contrast on different colored papers is shown for both invisible fluorescent ink using inverse contrast and black fluorescent ink using regular contrast. Paper reflectance was measured with an Xrite AS400 densitometer with an orthochromatic filter. The four samples tested comprised four different color envelopes (Env. B, Env. D, Env. R and Env. E). The optical density (O.D.) and reflectance (R) of the four envelopes were:

TABLE 7

| Envelope | O.D. | R (%) |
|---|---|---|
| B | 0.09 | 83 |
| D | 0.12 | 78 |
| E | 0.56 | 50 |
| R | 0.33 | 26 |

As can be seen, the ink contrast for both inks is above 50 percent even for envelope E having a reflectance of only 26 percent and an optical density of 0.33. Thus, the present invention can easily be used with colored papers as well as white paper.

Figure 19:
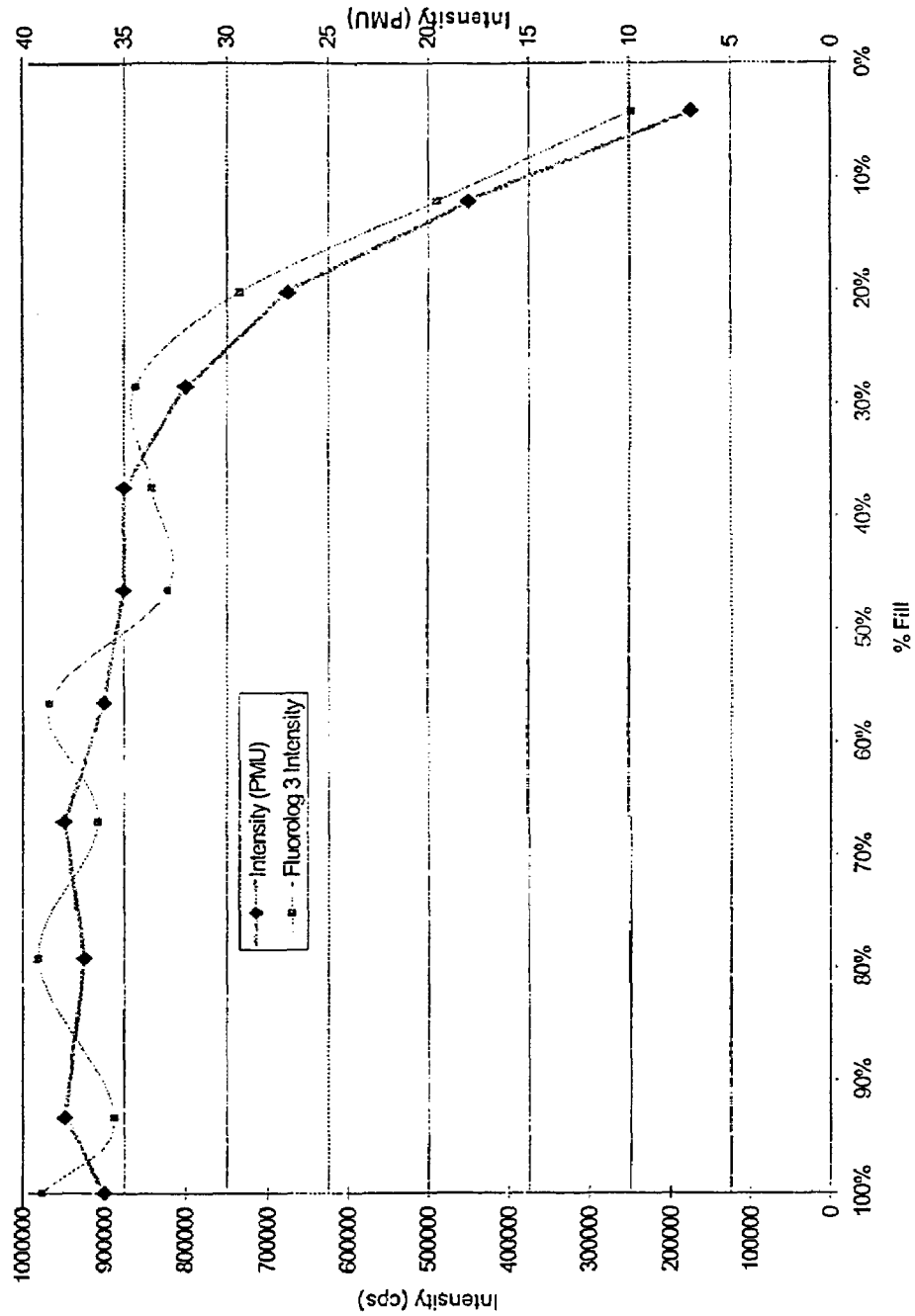
FIG. 19 is a chart showing fluorescent intensity for Ink 1 measured in both Phosphor Meter Units (PMU) and photon counts (cps) is shown versus percent (%) fill.

Referring also to FIG. 19, a chart is provided showing fluorescent intensity for Ink 1 measured in both Phosphor Meter Units (PMU) and photon counts (cps) versus percent (%) fill. As can be seen, the fluorescent intensity measured in photon counts is substantially the same as the fluorescent intensity measured in Phosphor Meter Units (PMU) and described above with reference to FIGS. 7 and 8.

Figure 20:
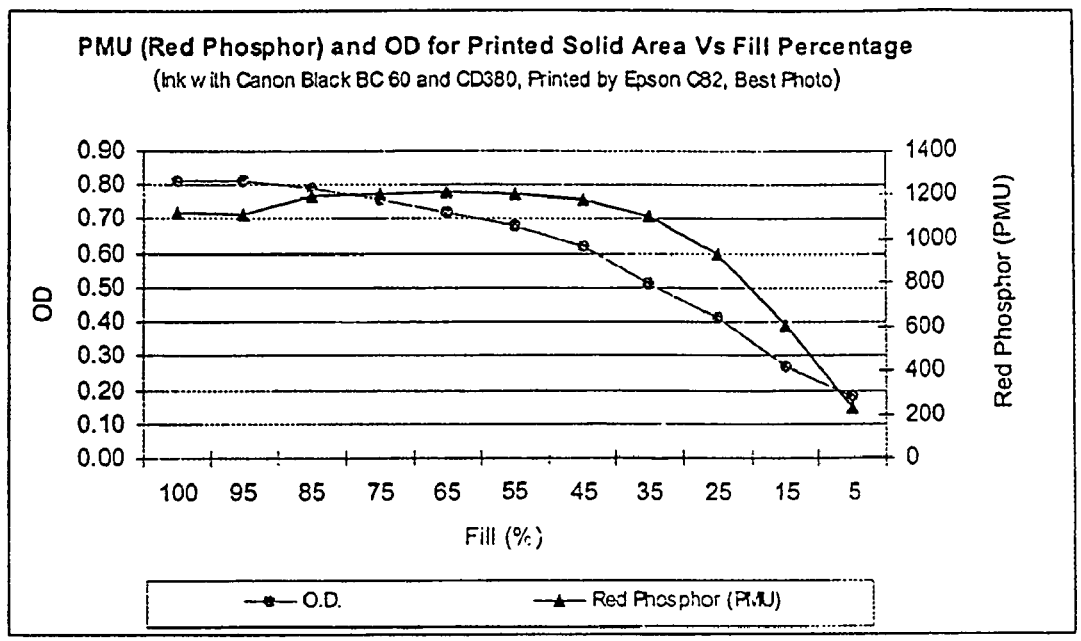
FIG. 20 is a chart showing optical density and phosphorescent intensity of Ink 1 versus different percentages (%) of fill.
Figure 21:
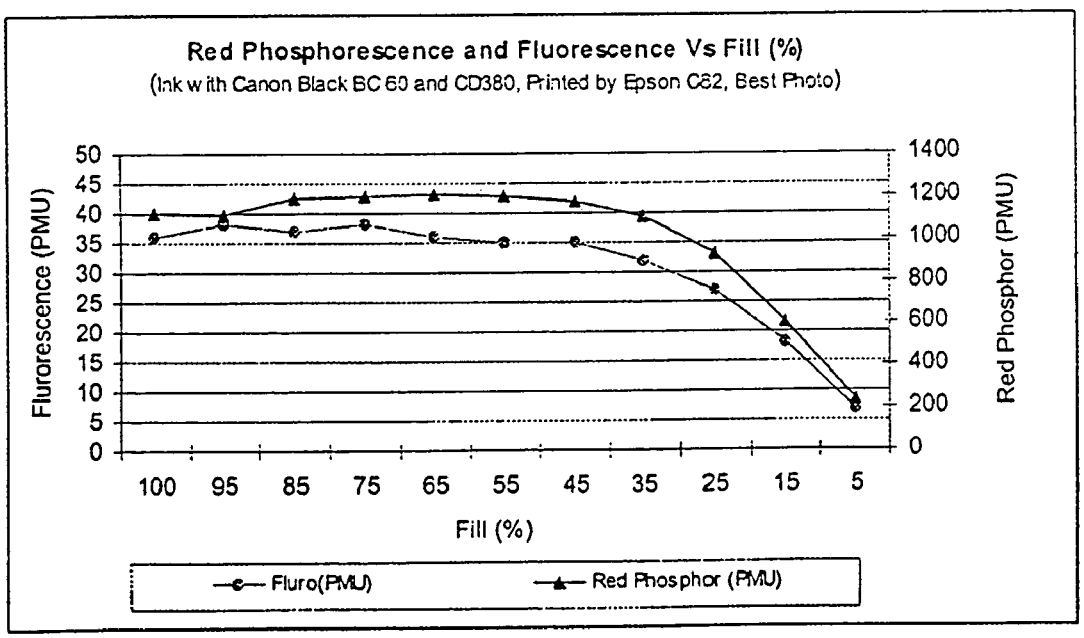
FIG. 21, a chart showing fluorescence intensity versus percentage of fill and phosphorescence intensity versus percentage of fill for Ink 1.

Referring now to FIG. 20, a chart is provided showing optical density and phosphorescent intensity of Ink 1 versus different percent (%) of fill. Referring also to FIG. 21, a chart is provided showing fluorescence intensity versus percentage of fill and phosphorescence intensity versus percentage of fill for Ink 1. The phosphorescent intensity was measured in red phosphor (PMU). The samples were printed with an EPSON® C82 printer set at best photo mode. This shows that after excitation, Ink 1 can also be read by phosphorescence without real time excitation; i.e., delayed fluorescence or luminescence without real time excitation. Thus, use of a fluorescent ink with a rare earth complex can allow for reading of the image/indicium by fluorescence and/or phosphorescence and/or white light. A reading system could be devised which uses any or all of these detection methods. For example, white light could be used to detect the indicium, a fluorescence reader could be used to read the indicium, and a phosphorescence reader could be used to read the indicium again as a double scanning type of reading.

The reading apparatus could also be adapted to read or detect the percentage of fill. This could also be used to as a covert messaging system, such as printing the indicium with different percentages of fill for different types of postage meters to monitor the use of the meters, or printing different percentages of fill for different users or different times of day to monitor the users or gather marketing data on when the users use the postage meters. Another example could comprise printing the indicium with different percentages of fill based upon the value of the postage. A larger value could be printed with a larger percentage of fill. Another example could comprise printing the indicium with different percentages of fill based upon volume of postage being printed, such as reducing the percentage of fill as postage is being printed after a predetermined number during a predetermined time, such as after printing 25 postage indiciums on 25 mail pieces within one minute, or if a user enters that 25 or more postage indiciums should be printed by the postage meter. The number "25" used above is merely an example of a plurality, and should not be considered limiting.

Figure 22:
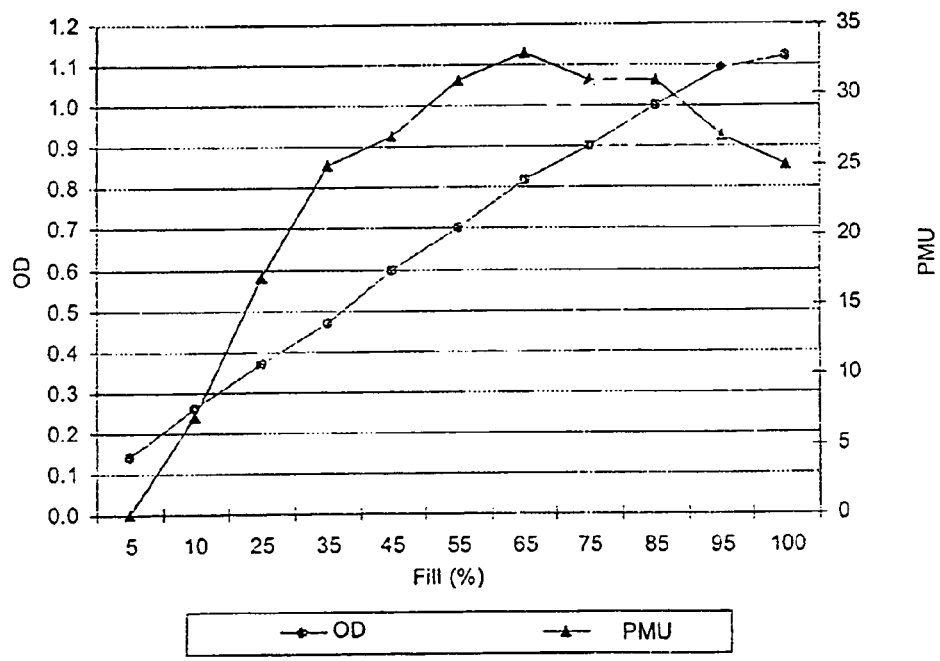
FIG. 22 is a chart showing fluorescent intensity and optical density versus percent (%) fill for a third ink formulation; Ink 3.

Referring now to FIG. 22, a chart showing fluorescent intensity and optical density versus percent (%) fill for a third ink, Ink 3 is shown. Ink 3 comprised the following formulation of black fluorescent (BF) ink which included a rare earth complex:

TABLE 8

Formulation of BF Ink Using Acryjet Black 357 and CD380 (Lot#03-183-34)

| Components | wt (%) |
|---|---|
| Lumilux CD 380 | 22.7 |
| Acryjet Black 357 | 17.1 |
| Glycerol | 3.0 |
| Triethylene Glycol mono n-Butyl Ether | 4.0 |
| 1,2,4-Butanetriol | 2.5 |
| Urea | 2.0 |
| Distilled Water | 48.8 |
| Total | 100.00 |
| PMU (drawdown) | 64 |
| OD (drawdown) | 1.08 |
| pH | 6.94 |
| Viscosity (cp) | 4.34 |
| Surface Tension (dyne/cm) | 43.7 |

Figure 23:
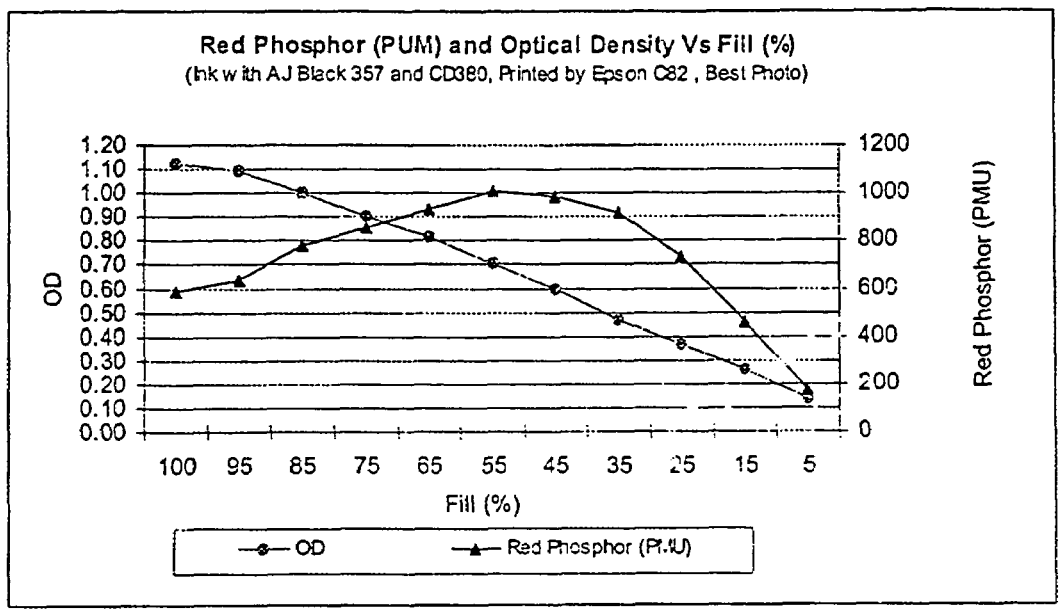
FIG. 23 is a chart for Ink 3 of optical density versus percent fill and phosphorescence intensity versus percent fill.
Figure 24:
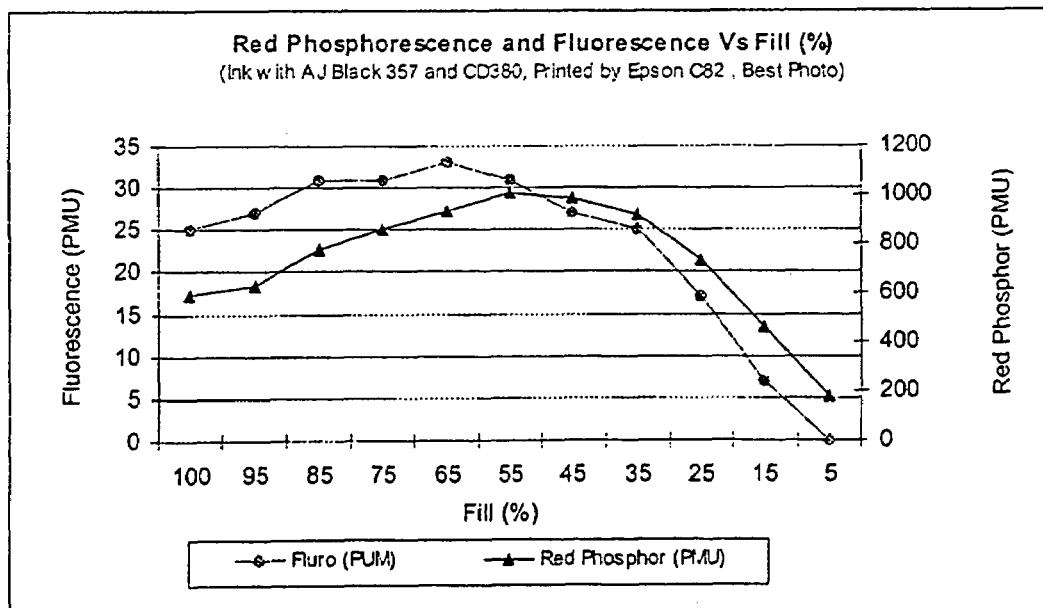
FIG. 24 is a chart for Ink 3 of fluorescence intensity versus percent fill and phosphorescence intensity versus percent fill.

Acryjet Black 357 is a commercially available ink sold by Pitney Bowes, Inc. Referring also to FIGS. 23 and 24, measurement charts are shown for Ink 3 of optical density versus percent fill and phosphorescence intensity versus percent fill, and fluorescence intensity versus percent fill and phosphorescence intensity versus percent fill, respectively. As can be seen, use of less than 100 percent fill can still provide good optical density, phosphorescence intensity, and fluorescence intensity. This has been found to be acceptable in printing a two-dimensional bar code with less than 100 percent fill, and even less than 50 percent fill, but still be machine readable, such as by fluorescence or phosphorescence. Although the present invention has been described with reference to the exemplary ink formulations described above, features of the present invention could be used with other types of ink formulations, including ink formulations which do not comprise a rare earth complex.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for printing indicium on an article comprising steps of:
    providing a supply of ink comprising a multi-signal transmission ink which is adapted to provide an optically visual signal when viewed in normal daylight and adapted to provide a different signal which is adapted to be machine readable; and
    printing at least a portion of the indicium on the article by halftone printing the multi-signal transmission ink, wherein the portion is visually observable as a halftoned signal in normal daylight, and wherein the portion is read as a non-halftoned signal by a machine even though the portion is halftone printed.

2. A method as in claim 1 wherein the multi-signal transmission ink comprises fluorescent ink.

3. A method as in claim 1 wherein the multi-signal transmission ink comprises color fluorescent ink.

4. A method as in claim 3 wherein the color fluorescent ink comprises a rare earth complex.

5. A method as in claim 3 wherein the color fluorescent ink provides an increased percentage of print growth relative to non-fluorescent ink to provide enlarged print growth per pixel.

6. A method as in claim 1 wherein the multi-signal transmission ink comprises phosphoresecent ink.

7. A method as in claim 1 wherein the different signal comprises a magnetic signal or an electrical signal.

8. A method for printing indicium on an article comprising steps of:
- providing a supply of ink comprising a multi-signal transmission ink which is adapted to provide an optically visual signal when viewed in normal daylight and adapted to provide a different signal which is adapted to be machine readable; and
- printing at least a portion of the indicium on the article by halftone printing the multi-signal transmission ink, wherein the portion is visually observable as a halftoned signal in normal daylight, and wherein the portion is read as a non-halftoned signal by a machine even though the portion is halftone printed, wherein the step of printing comprises halftone printing with a fill of less than 50 percent.

9. A method for printing indicium on an article comprising steps of:
- providing a supply of ink comprising a multi-signal transmission ink which is adapted to provide an optically visual signal when viewed in normal daylight and adapted to provide a different signal which is adapted to be machine readable; and
- printing at least a portion of the indicium on the article by halftone printing the multi-signal transmission ink, wherein the portion is visually observable as a halftoned signal in normal daylight, and wherein the portion is read as a non-halftoned signal by a machine even though the portion is halftone printed, wherein the step of printing comprises halftone printing with a fill of about 15 percent.

* * * * *